US007124867B2

(12) United States Patent
Matsufuji et al.

(10) Patent No.: US 7,124,867 B2
(45) Date of Patent: Oct. 24, 2006

(54) TRAVELING TRANSMISSION OF WORKING VEHICLE

(76) Inventors: Mizuya Matsufuji, c/o Kanzaki Kokyukoki Mfg. Co., Ltd., 18-1, Inadera 2-Chome, Amagasaki-shi, Hyogo (JP); Gen Yoshii, c/o Kanzaki Kokyukoki Mfg. Co., Ltd., 18-1, Inadera 2-Chome, Amagasaki-shi, Hyogo (JP); Takumi Fujita, c/o Kanzaki Kokyukoki Mfg. Co., Ltd., 18-1, Inadera 2-Chome, Amagasaki-shi, Hyogo (JP)

( * ) Notice: Subject to any disclaimer, the term of this patent is extended or adjusted under 35 U.S.C. 154(b) by 89 days.

(21) Appl. No.: 10/509,744

(22) PCT Filed: Apr. 3, 2003

(86) PCT No.: PCT/JP03/04270
§ 371 (c)(1),
(2), (4) Date: Sep. 30, 2004

(87) PCT Pub. No.: WO03/085289

PCT Pub. Date: Oct. 16, 2003

(65) Prior Publication Data
US 2005/0120818 A1    Jun. 9, 2005

(30) Foreign Application Priority Data

| Apr. 4, 2002 | (JP) | ............................. 2002-102721 |
| Jul. 18, 2002 | (JP) | ............................. 2002-209433 |
| Sep. 3, 2002 | (JP) | ............................. 2002-258083 |

(51) Int. Cl.
  *B60W 10/02* (2006.01)
  *B60W 10/10* (2006.01)
  *B60K 20/00* (2006.01)
  *F16H 59/56* (2006.01)
  *F16D 25/10* (2006.01)
(52) U.S. Cl. ................... 192/3.58; 192/3.62; 192/3.63; 192/87.13

(58) Field of Classification Search ................ None
See application file for complete search history.

(56) References Cited

U.S. PATENT DOCUMENTS 5,669,479 A * 9/1997 Matsufuji ................ 192/87.15

(Continued)

FOREIGN PATENT DOCUMENTS

EP        1 090 798 A1    4/2001

(Continued)

OTHER PUBLICATIONS

English translation of International Search Report for Appl. No. PCT/JP03/04270, Japanese Patent Office, mailed on Jul. 15, 2003, 2 pages.

(Continued)

*Primary Examiner*—Richard M. Lorence
(74) *Attorney, Agent, or Firm*—Sterne, Kessler, Goldstein & Fox P.L.L.C.

(57) ABSTRACT

In a traveling transmission in which an auxiliary transmission is interposed between a main clutch and a mechanical transmission, the auxiliary transmission is configured such that power transmission is cut out interlockingly with the disengagement operation of the main clutch. For example, the auxiliary transmission is configured as a high-low speed selector device including a hydraulic-operated first hydraulic clutch and a spring-operated second hydraulic clutch. Preferably, there should be provided a controller for changing the position of a direction switching valve for the first and second hydraulic clutches based on the operation of an operating member such as a pedal for disengaging the main clutch. According to the present invention, it is possible to shorten a time required for a speed change operation by the mechanical transmission and, also, to achieve a smooth operation by the mechanical transmission.

7 Claims, 23 Drawing Sheets

U.S. PATENT DOCUMENTS

| | | | | |
|---|---|---|---|---|
| 6,003,391 | A | * 12/1999 | Kojima et al. | 74/15.66 |
| 6,199,441 | B1 | * 3/2001 | Kanenobu et al. | 74/331 |
| 2003/0042104 | A1 | * 3/2003 | Matsufuji et al. | 192/87.11 |

FOREIGN PATENT DOCUMENTS

| | | | |
|---|---|---|---|
| EP | 1090798 | A1 * | 4/2001 |
| EP | 1 111 274 | A2 | 6/2001 |
| EP | 1 138 985 | A2 | 10/2001 |
| EP | 1 111 274 | A3 | 5/2002 |
| EP | 1 138 985 | A3 | 6/2002 |
| JP | 63-43050 | A | 2/1988 |
| JP | 1-143452 | U | 10/1989 |
| JP | 2-146373 | A | 6/1990 |
| JP | 4-107348 | A | 4/1992 |
| JP | 5-12250 | U | 2/1993 |
| JP | 7-33732 | U | 6/1995 |
| JP | 08002267 | A * | 1/1996 |
| JP | 2000-352446 | A | 12/2000 |

OTHER PUBLICATIONS

Supplemental European Search Report for European Appl. No. 0374 5896 (from International Appl. No. PCT/JP03/04270), European Patent Office, Munich, mailed on Jul. 7, 2006, 3 pages.

* cited by examiner

TRAVELING TRANSMISSION OF WORKING VEHICLE

TECHNICAL FIELD

The present invention relates to a traveling transmission for a working vehicle, in which an auxiliary transmission of at least two gear shifts such as a high-low speed selector device or a front-back travel selector device is interposed between a main clutch and a multi-speed-stage mechanical transmission.

BACKGROUND ART

The above-described type of traveling transmission has been well known, as disclosed in JP-A 2000-352446. In a transmission disclosed in the above publication, a pair of auxiliary transmissions, i.e., a front-back travel selector device and a high-low speed selector device are interposed between a main clutch and a multi-speed-stage mechanical transmission.

However, in the conventional transmission, the auxiliary transmission is kept in a transmission state when the main clutch is disengaged during a speed change operation by the mechanical transmission. With the above configuration, inertial rotation is continued in the auxiliary transmission when the main clutch is disengaged, thereby applying an inertial mass of the auxiliary transmission to the mechanical transmission. Therefore, there has arisen an inconvenience that a time is required for the speed change operation in the mechanical transmission, or that a gear shift shock or an abnormal noise occurs in the mechanical transmission.

One object of the present invention is to provide a novel traveling transmission for a working vehicle without raising those problems experienced in the conventional art.

DISCLOSURE OF THE INVENTION

In order to achieve the above object, a first aspect of the present invention provides a traveling transmission for a working vehicle. The traveling transmission includes an auxiliary transmission has at least two speed stages and is interposed between a main clutch and a multi-speed-stage mechanical transmission. The auxiliary transmission is configured such that power transmission is cut out interlockingly with the disengagement operation of the main clutch.

With this traveling transmission, since the auxiliary transmission is configured such that the power transmission is cut out interlockingly with the disengagement operation of the main clutch, which is disengaged during a speed change operation of the mechanical transmission, it is possible to prevent the inertial mass of the auxiliary transmission from being exerted on the mechanical transmission during the speed change operation of the mechanical transmission.

Consequently, the speed change operation of the mechanical transmission can be finished in a short time and, further, a shock or an abnormal noise in the mechanical transmission at the speed change operation can be remarkably reduced, thus improving a gear shift feeling for the speed change operation.

The above-described effect produced by the present invention can be further enhanced in the case where the mechanical transmission is of a gear continuously engaging type provided with a synchronous clutch. In other words, in the gear continuously engaging type provided with a synchronous clutch, rotational synchronization by the synchronous clutch of the mechanical transmission can be more smoothly achieved by eliminating inertial rotation on a driving side of the mechanical transmission.

In the case where the auxiliary transmission may be configured as a high-low speed selector device for obtaining the two speed stages, including a hydraulic-operated first hydraulic clutch and a spring-operated second hydraulic clutch, it is preferable that the auxiliary transmission is such configured as to be drained operating oil from the first hydraulic clutch and, also, to be supplied the operating oil to the second hydraulic clutch, thereby cutting out the power transmission.

According to this preferable aspect, since a transmission path in the auxiliary transmission can be secured by the spring-operated second hydraulic clutch, the working vehicle can be moved to a service station or the function of an engine brake can be secured even if a fault occurs in a hydraulic system.

More preferably, the operating oil is controlled to be supplied to/discharged from the first and second hydraulic clutches by controlling the position of a direction switching valve interlocking with operating member for operating the main clutch.

According to this aspect, it is possible to easily supply/discharge the operating oil to/from the first and second hydraulic clutches.

The position of the direction switching valve can be controlled by, for example, a controller for outputting an operating signal according to the disengagement operation of the main clutch.

Preferably, the controller may output a control signal to the direction switching valve in response to a signal output from a sensor for detecting an operating quantity of the operating member for the main clutch.

In the above-described various configurations, it is preferable that the auxiliary transmission is configured such that the power transmission is cut out after the main clutch is completely disengaged during the disengagement operation of the main clutch and, also, the power transmission is restored before the main clutch starts the power transmission during the engagement operation of the main clutch.

According to this preferable configuration, since the auxiliary transmission is never concerned in power transmission when the working vehicle is stopped or started by disengaging or engaging the main clutch, it is unnecessary to employ big clutches that have the large clutch capacity in the auxiliary transmission, thereby making the auxiliary transmission compact.

In this preferable configuration, the power transmission is performed or is cut out in the auxiliary transmission based on the operating quantity of the operating member for engaging or disengaging the main clutch, thereby facilitating the interlock and cooperation between the auxiliary transmission and the main clutch.

A second aspect of the present invention provides a novel synchronous gear device which is inserted into a transmission path for a vehicle.

That is, a synchronous gear device is configured such that members on driving and driven sides are made the same in rotational speed as each other by frictional force and, then, they mesh with each other, thereby achieving a smooth speed change operation.

FIGS. 18(a) to 18(d) show a conventional synchronous gear device. As shown in FIGS. 18(a) to 18(d), the conventional synchronous gear device 400 includes: a clutch hub 410 supported in a non-rotatable manner on one shaft 500 of a driving shaft and a driven shaft; a sleeve 420 fitted around the clutch hub 410 in a relatively non-rotatable manner and in a movable manner in an axial direction; an index key 430 interposed between the clutch hub 410 and the sleeve 420 in a non-rotatable manner relatively to the clutch hub 410 and in a movable manner in the axial direction; gears 440a, 440b operatively connected to the other shaft of the driving shaft and the driven shaft; synchronized cones 450a, 450b, each having a tapered peripheral frictional surface, connected to the gears 440a, 440b in a relatively non-rotatable manner; synchronizer rings 460a, 460b having tapered circumferential frictional surfaces facing to the tapered peripheral frictional surfaces of the synchronized cones 450a, 450b, respectively, in a rotatable manner relatively to the clutch hub only within a predetermined range and in a movable manner in the axial direction; and an urging member 480 for pressing the index key 430 toward the sleeve 420.

The index key 430 has a projection projecting outward in a radial direction and, further, the sleeve 420 has a recess formed into a shape in conformity with the projection formed at the index key 430.

Description will be given below of operation of the conventional synchronous gear device 400 in the case where the gear 440a rotated by the inertia of a drive wheel and the clutch hub 410 are operatively connected to each other by moving the sleeve 420 toward one side in the axial direction (that is, leftward in FIGS. 18(a) to 18(d)) in a mode in which the clutch hub 410 is disposed on the driving side while the gears 440a, 440b are disposed on the driven side.

First, when the sleeve 420 is moved toward one side in the axial direction from a neutral position shown in FIG. 18(a), the index key 430 is moved toward one side in the axial direction together with the sleeve 420 by the urging force of the urging member 480. The index key 430, which is moved toward one side in the axial direction, presses one synchronizer ring 460a (that is, left one in FIGS. 18(a) to 18(d)) toward one side in the axial direction. Consequently, one synchronizer ring 460a is moved toward an axially outward position, in which it operatively and frictionally engages with the tapered peripheral surface of one synchronized cone 450a corresponding to the tapered circumferential surface. Incidentally, in the illustration, outer intermediate cone rings 470a, 470b and inner intermediate cone rings 475a, 475b are interposed between the synchronizer rings 460a, 460b and the synchronized cones 450a, 450b, respectively, thereby increasing frictional areas between the synchronizer rings 460a, 460b and the synchronized cones 450a, 450b.

As described above, when one synchronizer ring 460a is moved to the axially outward position, frictional torque is generated at a frictional surface between one synchronizer ring 460a and the corresponding synchronized cone 450a. Further, when the frictional torque is increased by moving the sleeve 420 toward one side in the axial direction, the synchronizer ring 460a is started to be rotated in synchronism with the synchronized cone 450a.

In this operation, upon completion of the synchronization between the synchronizer ring 460a and the synchronized cone 450a, the frictional torque generated there between is dissipated. In this state, the sleeve 420 can be moved toward one side in the axial direction. When the sleeve 420 is moved toward one side in the axial direction, a spline of the sleeve 420 is first inserted into a chamfer of the synchronizer ring 460a and, then, is meshed with a spline of the synchronized cone 450a, thereby finishing a speed change operation (see FIG. 18(b)).

Here, after the synchronizer ring 460a is moved to the axially outward position, the sleeve 420 is moved toward one side in the axial direction relatively to the index key 430 while pressing the index key 430 inward in a radial direction against the urging force of the urging member 480 since the index key 430 is inhibited from being moved toward one side in the axial direction by the synchronizer ring 460a. In other words, as shown in FIG. 18(b), in the state in which the spline of the sleeve 420 meshes with the spline of the synchronized cone 450a (hereinafter, referred to as "a first transmission state"), a projection formed at the index key 430 disengages from a recess formed at the sleeve 420 and, thus, engages with a horizontal portion on the other side of the sleeve positioned on the other side in the axial direction with respect to the recess.

Although the conventional synchronous gear device 400 can be operated as described above, so as to achieve a smooth speed change operation, it raises inconveniences as described below.

In order to return the first transmission state to a neutral state, when the sleeve 420 is moved toward the other side in the axial direction (rightward in FIGS. 18(a) to 18(d)), the index key 430 is moved toward the other side in the axial direction together with the sleeve 420 by the frictional force generated by the urging force of the urging member 480 and, then, abuts against the synchronizer ring 460b on the other side (FIG. 18(c)).

In this state, when the sleeve 420 is further moved toward the other side in the axial direction in order to return the sleeve 420 to the neutral position, the index key 430 stays at that position. That is, after the synchronizer ring 460b on the other side is located at the axially outward position (FIG. 18(c)), reaction force in excess of the frictional force between the sleeve 420 and the index key 430, generated by the urging force of the urging member 480, is exerted on the index key 430 from the synchronizer ring 460b on the other side. As a consequence, in the state in which the index key 430 stays at that position, only the sleeve 420 is moved toward the other side in the axial direction and, thus, returns to the neutral position (FIG. 18(d)).

At this time, the projection formed at the index key 430 cannot engage with the recess formed at the sleeve 420, but remains riding on the horizontal portion on the other side of the sleeve 420 in the conventional synchronous gear device 400, as shown in FIG. 18(d).

In order to achieve the first transmission state in this state, the sleeve 420 is moved again toward one side in the axial direction, so that pressing force against the synchronizer ring 460a on one side cannot act sufficiently, thereby causing a trouble in the speed change operation.

In this manner, there may be a possibility that the index key 430 cannot be returned to the neutral position when the transmission state is returned to the neutral state in the conventional synchronous gear device 400.

Thus, the second aspect of to the present invention has been accomplished in view of the prior art. Therefore, an object of the second aspect of the present invention is to provide a synchronous gear device configured such that an index key is securely returned to a neutral position when a sleeve is located at the neutral position.

In order to achieve the above object, the second aspect of the present invention provides a synchronous gear device including: a clutch hub supported in a non-rotatable manner relatively on one shaft of a driving shaft and a driven shaft; a sleeve fitted around the clutch hub in a relatively non-rotatable manner and in a movable manner in an axial direction; an index key interposed between the clutch hub and the sleeve in a non-rotatable manner relatively to the clutch hub and in a movable manner in the axial direction; a gear operatively connected to the other shaft of the driving shaft and the driven shaft; a synchronized cone having a tapered peripheral frictional surface, connected to the gears in a relatively non-rotatable manner; a synchronizer ring having tapered circumferential frictional surface facing to the tapered peripheral frictional surface of the synchronized cone, and engaging with the clutch hub in a relatively rotatable manner only within a predetermined range in a circumferential direction, the synchronizer ring being movable in the axial direction from an axially inward position nearest the clutch hub inward in the axial direction to an axially outward position outward in the axial direction in which the tapered circumferential frictional surface operatively and frictionally engages with the tapered peripheral frictional surface of the synchronized cone; and an urging member for pressing the index key toward the sleeve. The index key has a projection orienting outward in a radial direction. The sleeve has a recess including a deepest portion most apart outward in the radial direction from one shaft of the driving shaft and the driven shaft, and an inclining portion inclined inward in the radial direction from the deepest portion as it goes outward in the axial direction. The recess is configured such that the deepest portion and the inclining portion selectively engage with the projection formed at the index key. An axial length A of the inclining portion is longer than an axial movement distance B, by which the index key is moved from the neutral position when the synchronizer ring is moved to the axially outward position.

With this configuration, the inclining portion engages with the projection formed at the index key when the sleeve is returned to the neutral position, so that the index key can be automatically returned to the neutral position.

The synchronous gear device is preferably configured such that a clearance equivalent to an axial distance C is formed between an axial outer end of the synchronizer ring and an opposite portion of the synchronized cone when the synchronizer ring is located at the axially outward position, and the axial length A of the inclining portion can be made longer than a distance obtained by adding the axial distance C to the axial movement distance B of the index key.

With this preferred configuration, even if the frictional surface of the synchronizer ring and/or the synchronized cone is abraded so that the distance B, by which the index key can be moved outward in the axial direction from the neutral position, becomes long, the inclining portion engages with the projection of the index key when the sleeve is returned to the neutral position, thereby automatically returning the index key to the neutral position.

More preferably, the sleeve has a horizontal portion which can engage with the projection of the index key outward in the axial direction of the recess.

Furthermore, a third aspect of the present invention provides a novel synchronous gear device that is inserted into a transmission path for a vehicle.

That is, the synchronous gear device includes: a clutch hub and a gear supported in a rotatable manner relatively to each other on a rotary shaft; a synchronized cone rotated integrally with the gear; a synchronizer ring interposed between the clutch hub and the synchronized cone; a sleeve inserted around the clutch hub in a non-rotatable manner relatively to the clutch hub and in a movable manner in an axial direction; and an index key interposed between the clutch hub and the sleeve.

In this synchronous gear device, the index key, which is moved outward in the axial direction via the sleeve, is configured to press the synchronizer ring outward in the axial direction; therefore, the synchronizer ring pressed outward in the axial direction and the synchronized cone frictionally engage with each other, to be thus rotated in synchronism with each other, so that an inner spline of the sleeve meshes with an outer spline of the synchronized cone.

An increase in synchronous clutch capacity in addition to miniaturization of the device per se are required for the synchronous gear device. However, the increase and the miniaturization are mutually contradictory. There has been no conventional synchronous gear device which can solve both of the problems at the same time.

In other words, if the movable range of the synchronizer ring in the axial direction is enlarged, the synchronous clutch capacity can be increased, although the size of the device per se becomes large.

Namely, in order to enlarge the movable range of the synchronizer ring in the axial direction, an axial distance between the clutch hub and the synchronized cone must be increased, thereby enlarging the size of the device per se.

In the meantime, there has been proposed a synchronous gear device of a plural cone ring type, in which a plurality of frictional surfaces are formed between a synchronizer ring and a synchronized cone so as to increase a substantially frictional area therebetween by constituting the synchronizer ring of a plurality of cone rings. However, there are not any consideration of the relationship between the movable range of the synchronizer ring in the axial direction and the increased size of the device per se.

Additionally, there has been proposed a configuration in which the cone rings connected to a clutch hub in a relatively non-rotatable manner are connected via a connecting portion in order to effectively utilize the plurality of frictional surfaces formed between the synchronizer ring and the synchronized cone in the above-described synchronous gear device of a plural cone ring type.

With this configuration, since the cone rings on the side of the clutch hub are moved integrally with each other in the axial direction, the frictional engagement between the synchronizer ring and the synchronized cone can be efficiently performed via the plurality of frictional surfaces.

However, the connecting portion is located between the clutch hub and the synchronized cone; therefore, the axial distance between the clutch hub and the synchronized cone becomes great by providing the connecting portion, resulting in a large size of the device per se.

Thus, the third aspect of the present invention has been accomplished in view of the prior art. Therefore, an object of the third aspect of the present invention is to provide a synchronous gear device in which a movable range of a synchronizer ring in an axial direction can be effectively obtained while suppressing a large size of a device.

In order to achieve the above object, the third aspect of the present invention provides a synchronous gear device including: a clutch hub and a gear supported in a rotatable manner relatively to each other on a rotary shaft; a synchronized cone rotated integrally with the gear; a synchronizer ring interposed between the clutch hub and the synchronized cone, the synchronizer ring having at least an outer cone ring, a middle cone ring and an inner cone ring, which are superimposed in a radial direction; a sleeve inserted around the clutch hub in a non-rotatable manner relatively to the clutch hub and in a movable manner in an axial direction; an index key interposed between the clutch hub and the sleeve, the index key bringing the synchronizer ring into a frictional engagement with the synchronized cone by pressing the synchronizer ring interlockingly with the axial movement of the sleeve; and a spring accommodated inside of the clutch hub so as to urge the index key toward an inner spline of the sleeve. The outer cone ring and the inner cone ring are connected to each other in such a manner as to be moved integrally with each other via a connecting portion disposed at an axial inner end. A cavity, into which the connecting portion can be inserted in the axial direction, is formed at a position, displaced from the spring accommodating portion in a circumferential direction, of the axial end surface of the clutch hub.

With this configuration, the movable range of the synchronizer ring in the axial direction can be enlarged as possible while suppressing an increase in size of the device per se.

Preferably, there may be provided a plurality of index keys spaced at equal intervals in the circumferential direction, and the cavities may be formed between the plurality of index keys in the circumferential direction.

In order to achieve the above object, the third aspect of the present invention also provides a synchronous gear device including: a clutch hub and a gear supported in a rotatable manner relatively to each other on a rotary shaft; a synchronized cone rotated integrally with the gear; a synchronizer ring interposed between the clutch hub and a spline piece; a sleeve inserted around the clutch hub in a non-rotatable manner relatively to the clutch hub and in a movable manner in an axial direction; and an index key interposed between the clutch hub and the sleeve, the index key causing the synchronizer ring to frictionally engage with the synchronized cone by pressing the synchronizer ring interlockingly with the axial movement of the sleeve. The synchronizer ring and the synchronized cone frictionally engaging with each other, to be thus rotated in synchronism with each other, so that an inner spline of the sleeve engages with an outer spline of the synchronized cone. In the thus constructed synchronous device, the synchronized cone includes a tapered frictional surface frictionally engaging with the synchronizer ring, a wall extending outward in a radial direction from an axial outer end of the frictional surface, and the outer spline disposed at an peripheral edge in the radial direction of the wall. At least a chamfer of the outer spline projects in a direction approximate to the clutch hub from the wall, and a part of the synchronizer ring is exposed to a space inward in the radial direction of the chamfer.

With this configuration, the movable range of the synchronizer ring in the axial direction can be enlarged as possible while suppressing an increase in size of the device per se.

Other features and merits of the present invention will be clearly understood from description below with reference to the attached drawings.

BRIEF DESCRIPTION OF THE DRAWINGS

FIG. 12($b$) is a longitudinal cross-sectional plan view showing a meshing state of the sleeve, a synchronizer ring and a gear in the state illustrated in FIG. 12($a$).

FIG. 13($b$) is a longitudinal cross-sectional plan view showing the meshing state of the sleeve, the synchronizer ring and the gear in the state illustrated in FIG. 13($a$).

FIG. 14($b$) is a longitudinal cross-sectional plan view showing the meshing state of the sleeve, the synchronizer ring and the gear in the state illustrated in FIG. 14($a$).

FIG. 15($b$) is a longitudinal cross-sectional plan view showing the meshing state of the sleeve, the synchronizer ring and the gear in the state illustrated in FIG. 15($a$).

BEST MODE FOR CARRYING OUT THE INVENTION

Embodiment 1

Figure 1:
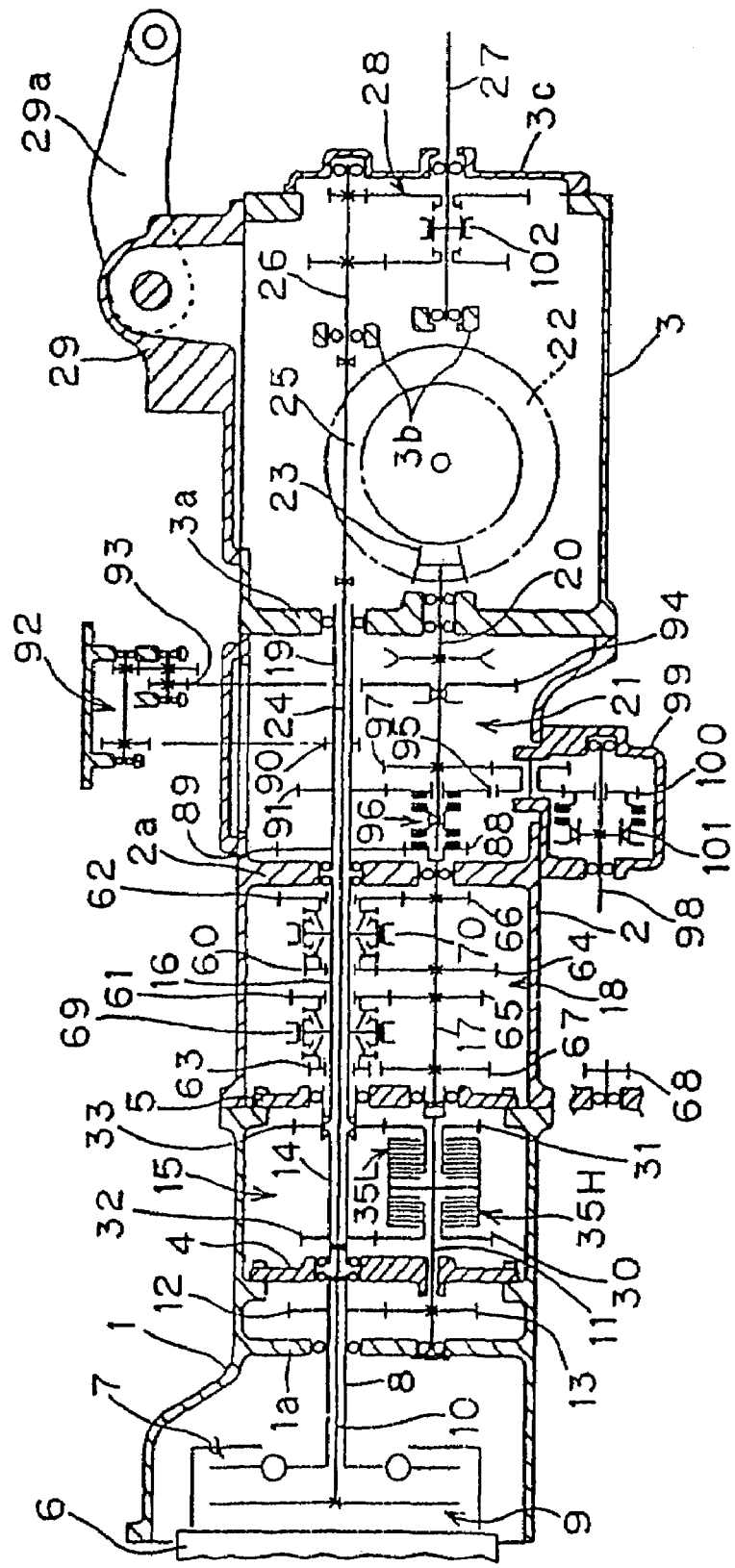
FIG. 1 is a view showing a transmission mechanism of a tractor provided with a transmission according to a preferred embodiment of the present invention.

FIG. 1 is a schematic view showing a tractor provided with a transmission according to a preferred embodiment of a first aspect of the present invention. The tractor is provided with a frame body containing the transmission therein. In the present preferred embodiment, the frame body includes a front housing 1, an intermediate housing 2 and a rear housing 3, which are connected in order in a lengthwise direction.

The front housing 1 includes a hollow front housing body, a support wall 1a disposed integrally with a substantially intermediate portion in the lengthwise direction of the front housing body, a first bearing frame 4 detachably connected to the front housing body behind the support wall 1a, and a second bearing frame 5 detachably connected to the rear end of the front housing body. Here, the second bearing frame 5 may be attached to and supported at the fore end of the intermediate housing 2.

The intermediate housing 2 includes a hollow intermediate housing body connected to the front housing body, and a support wall 2a disposed integrally with an intermediate portion in the lengthwise direction of the intermediate housing body.

The rear housing 3 includes a hollow rear housing body connected to the intermediate housing body, a fore wall 3a disposed integrally with the fore end of the rear housing body, a support wall 3b disposed integrally with an intermediate portion in the lengthwise direction of the back housing body, and a rear cover 3c detachably connected in such a manner as to close an opening formed at the rear end of the rear housing body.

In a space in front of the support wall 1a in the front housing 1 is contained an engine flywheel 6. The front housing 1 includes a hollow traveling motor shaft 8 connected to the engine flywheel 6 via a main clutch 7 of a traveling system and a PTO motor shaft 10 connected to the engine flywheel 6 via a main clutch 9 of a PTO system, both of the motor shafts 8 and 10 being arranged along the lengthwise direction.

The transmission includes a traveling system transmission mechanism from a drive source to a drive wheel, and a PTO system transmission mechanism for outputting drive force from the drive source outward of the frame body.

The traveling system transmission mechanism includes the motor shaft 8, a driving shaft 11 disposed under and substantially in parallel to the motor shaft 8, and gears 12, 13 which are supported in a non-rotatable manner relatively to the motor shaft 8 and the driving shaft 11, respectively, between the support wall 1a and the first bearing frame 4 and mesh with each other. The driving shaft 11 is supported at the fore and rear ends thereof by the support wall 1a and the second bearing frame 5, respectively, in a state in which the driving shaft 11 penetrates the first bearing frame 4.

The traveling system transmission mechanism further includes a hollow transmission shaft 14 disposed coaxially with the motor shaft 8 between the first and second bearing frames 4, 5, and a high-low speed selector device 15 interposed between the driving shaft 11 and the transmission shaft 14 as one example of auxiliary transmissions.

The traveling system transmission mechanism further includes a hollow driving shaft 16 connected in a non-rotatable manner about an axis relatively to the transmission shaft 14, a transmission shaft 17 disposed in a rotatable manner relatively to the driving shaft 11 on an extension line of the driving shaft 11, and a main transmission 18 interposed between the driving shaft 16 and the transmission shaft 17 as one example of mechanical transmissions. The driving shaft 16, the transmission shaft 17 and the main transmission 18 are arranged in a fore half inside of the intermediate housing 2.

The traveling system transmission mechanism further includes a hollow counter shaft 19 disposed in a rear half inside of the intermediate housing 2 in a rotatable manner relatively to the driving shaft 16 on the extension line of the driving shaft 16, a propeller shaft 20 disposed in the rear half inside of the intermediate housing 2 in a rotatable manner relatively to the transmission shaft 17 on the extension line of the transmission shaft 17, and an auxiliary transmission 21 for performing speed change transmission from the transmission shaft 17 or the counter shaft 19 to the propeller shaft 20. The rear end of the propeller shaft 20 extends into the back housing 3. At the extending portion is disposed a small bevel gear 23 meshing with an input bevel gear 22 of a differential gear (not shown) for right and left rear wheels.

The PTO system transmission mechanism includes a transmission shaft 24 connected in a non-rotatable manner about an axis relatively to the PTO motor shaft 10 and inserted into the hollow transmission shaft 14, the driving shaft 16 and the counter shaft 19, to be exposed to the inside of the rear housing 3, two transmission shafts 25, 26 disposed on the extension line of the transmission shaft 24 and connected in order in a non-rotatable manner about the axis relatively to the transmission shaft 24, a PTO shaft 27 extending backward of the frame body through the rear cover 3c, and a PTO transmission 28 interposed between the transmission shaft 26 and the PTO shaft 27.

On the top of the rear housing 3 is mounted a hydraulic lifter 29 provided with right and left lift arms 29a for lifting a work machine (not shown) to be driven by the PTO shaft 27.

Figure 2:
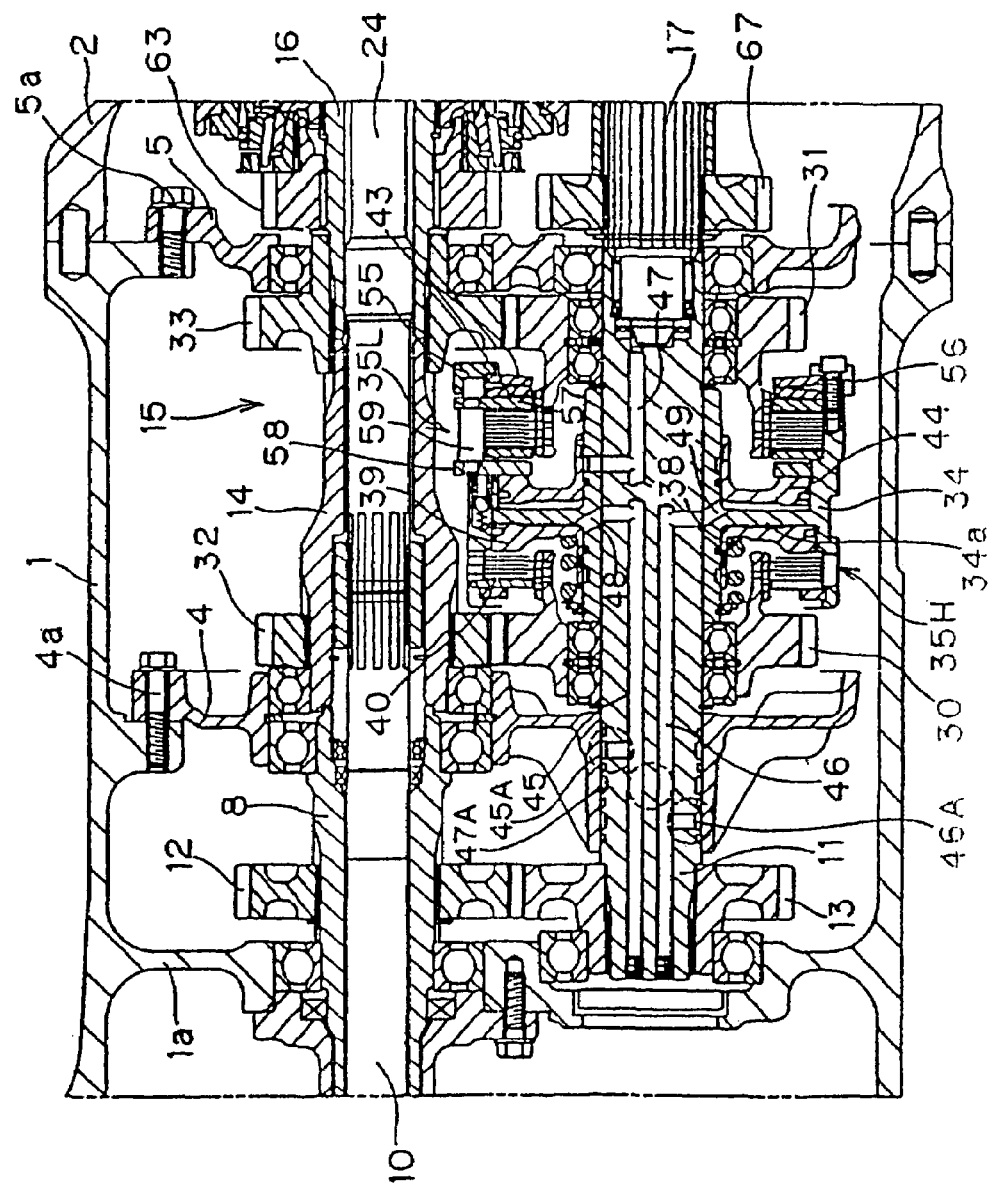
FIG. 2 is a longitudinal cross-sectional side view showing a specific structure of the transmission mechanism accommodated inside of an intermediate housing in the tractor shown in FIG. 1.

FIG. 2 shows a transmission structure inside of the front housing 1. The first and second bearing frames 4, 5 are detachably attached to bosses at the inner surface of the front housing 1 by the use of bolts 4a, 5a, respectively.

The high-low speed selector device 15 includes two gears 30, 31 loosely fitted onto the driving shaft 11, two gears 32, 33 fixed onto the transmission shaft 14 in such a manner as to mesh with the gears 30, 31, respectively, and a high-speed hydraulic clutch 35H and a low-speed hydraulic clutch 35L interposed between the gears 30, 31 on the driving shaft 11. The high-speed hydraulic clutch 35H and the low-speed hydraulic clutch 35L include a clutch cylinder 34 fixed onto the driving shaft 11 as a common member.

Figure 3:
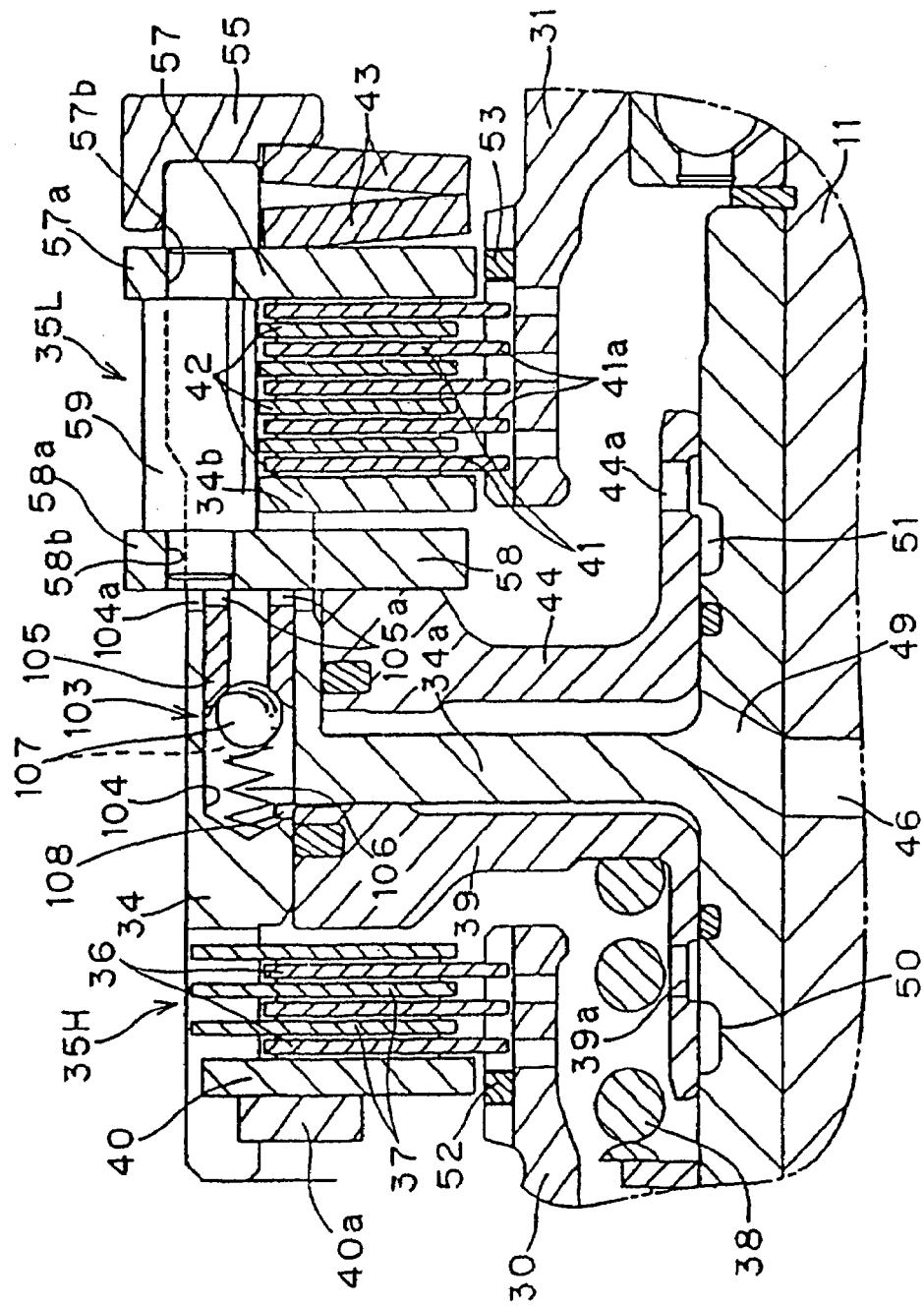
FIG. 3 is a longitudinal cross-sectional side view showing, in enlargement, a part of the structure shown in FIG. 2.

As shown in FIGS. 2 and 3, the high-speed hydraulic clutch 35H is provided with a plurality of frictional elements 36 supported in a non-rotatable manner relatively to a boss of the gear 30 and in a slidable manner in a clutch axial direction, a plurality of frictional elements 37 supported in a non-rotatable manner relatively to the clutch cylinder 34 and in a slidable manner in the clutch axial direction so as to be alternately positioned in the plurality of frictional elements 36, a piston 39 sliding toward the frictional elements 36, 37 by a hydraulic effect, a return spring 38 for urging the piston in a direction remote from the frictional elements 36, 37, and a pressure receiving plate 40 whose position in the clutch axial direction is restricted by a stopper ring 40a on a side opposite to the piston 39 while holding the plurality of frictional elements 36, 37 therebetween.

The high-speed hydraulic clutch 35H is configured as a frictional multi-plate clutch of a hydraulic operation type, which achieves clutch engagement by allowing the frictional elements 36, 37 to engage with each other between the piston 39 moving in the direction of the frictional elements 36, 37 by the hydraulic effect and the pressure receiving plate 40 immovable in the clutch axial direction.

In contrast, as shown in FIGS. 2 and 3, the low-speed hydraulic clutch 35L is provided with a plurality of frictional elements 41 supported in a non-rotatable manner relatively to a boss of the gear 31 and in a slidable manner in the clutch axial direction, a plurality of frictional elements 42 supported in a non-rotatable manner relatively to the clutch cylinder 34 and in a slidable manner in the clutch axial direction so as to be alternately positioned in the plurality of frictional elements 41, two disk springs 43 for allowing the frictional elements 41, 42 to frictionally engage with each other, and a piston 44 accommodated inside of the clutch cylinder 34 so as to release the engagement between the frictional elements 41, 42 by the hydraulic effect, as described later.

In this manner, the low-speed hydraulic clutch 35L is configured as a frictional multi-plate clutch of a spring operation type, which achieves clutch engagement by allowing the frictional elements 41, 42 to engage with each other by the urging member (see FIG. 3) while achieves clutch disengagement by releasing the engagement between the frictional elements 41, 42 by the hydraulic effect.

As shown in FIG. 2, in the driving shaft 11 are formed an operating oil passage 45 for the high-speed hydraulic clutch 35H, an operating oil passage 46 for the low-speed hydraulic clutch 35L and a lubricant passage 47. These passages 45, 46, 47 are bored at the fore end of the driving shaft 11, and further, bored ends are closed by plugs, respectively. Moreover, oil passage rotary joints 45A, 46A, 47A for connecting the passages 45, 46, 47 to oil passages, respectively, on a position stationary side are constituted of annular recesses formed at the peripheral surface of the driving shaft 11 and the first bearing frame 4 covering the annular recesses. At an internal surface of the circumferential wall of the clutch cylinder 34 are disposed oil passages 48, 49 communicating with the operating oil passages 45, 46, respectively. The oil passages 48, 49 are opened toward the pistons 39, 44, respectively, before and behind a central partition wall 34a of the cylinder 34. As shown in FIG. 3, the lubricant passage 47 is opened toward the frictional elements 36, 37, 41, 42 in the hydraulic clutches 35H, 35L via annular grooves 50, 51 formed at the inner surface of the internal circumferential wall of the clutch cylinder 34 and oil passage holes 39a, 44a formed in the internal circumferential walls of the pistons 39, 44.

As is clear from FIG. 3, the oil passage holes 39a, 44a formed in the internal circumferential walls of the pistons 39, 44 are configured such that their opening widths with respect to the annular grooves 50, 51 can be adjusted according to the positions of the pistons 39, 44, respectively. In other words, the oil passage hole 39a or 44a of the piston 39 or 44 in one of the hydraulic clutches 35H, 35L in engagement greatly communicates with the corresponding annular groove 50 or 51 while the other oil passage hole 39a or 44a of the other piston 39 or 44 in the other one of the hydraulic clutches 35H, 35L on a disengagement side hardly communicates with the corresponding annular groove 50 or 51.

With this configuration, a lubricant is supplied in a great quantity only to the hydraulic clutch 35H or 35L in engagement. In the meantime, the supply of the lubricant is suppressed with respect to the hydraulic clutch 35H or 35L in disengagement, thereby achieving effective use of the lubricant. Incidentally, at the bosses of the gears 30, 31 are disposed seals 52, 53 for suppressing any leakage of the lubricant from the disposing positions of the frictional elements 36, 37, 41, 42.

Here, the detailed structure of the low-speed hydraulic clutch 35L will be described with reference to FIGS. 2 to 4.

Only the frictional element 42 located at a foremost end, that is, nearest the piston 44 out of the plurality of frictional elements 42 supported by the clutch cylinder 34 is formed in slightly great thickness. As shown in FIG. 4, the clutch cylinder 34 includes a pressure receiving surface 34b in contact with the frictional element 42 at the foremost end in the clutch engagement state at the internal end surface, a plurality of cutout holes 34c cut out on a free end side on the peripheral wall, and a plurality of screw holes 34d at a free end on the peripheral wall. As shown in FIG. 2, the low-speed hydraulic clutch 35L further has a spring receiving ring 55 connected to the free end of the clutch cylinder via a plurality of bolts 55 screwed into the screw holes 34d, respectively. The disk spring 43 is held by the spring receiving ring 55, as shown in FIGS. 2 and 3.

The low-speed hydraulic clutch 35L further includes an operating plate 58 engaging with the piston 44 in a slidable manner in the clutch axial direction and in a non-rotatable manner relatively to the cylinder 34, and a pressing plate 57 spaced apart from the operating plate 58 so as to hold the plurality of frictional elements between the operating plate 58 and the same and connected to the operating plate 58 so as to be moved integrally with the operating plate 58. The disk spring 43 is held between the pressing plate 57 and the spring receiving ring 55, so that the plurality of frictional elements 41 and 42 receive urging force generated by the disk spring 43 between the pressure receiving surface 34b and the pressing plate 57.

Particularly, the operating plate 58 includes a ring-like body engaging with the piston 44, and a plurality of fitting projections 58a extending outward in the radial direction from the body, to be fitted into the plurality of cutout holes 34c formed at the clutch cylinder 34.

The pressing plate 57 includes a ring-like body engaging with the disk spring 43, and a plurality of fitting projections 57a extending outward in the radial direction from the body and corresponding to the plurality of fitting projections 58a formed at the operating plate 58.

The operating plate 58 and the pressing plate 57 are connected interlockingly with each other via interlocking rods 59 disposed at the plurality of fitting projections 58a and 57a. Particularly, fitting holes 58b, 57b are formed at the plurality of fitting projections 58a, 57a, respectively. The interlocking rod 59 has small-diameter portions formed at both ends and fitted into the fitting holes 58b and 57b, respectively, and large-diameter portions extending between the small-diameter portions.

Figure 4:
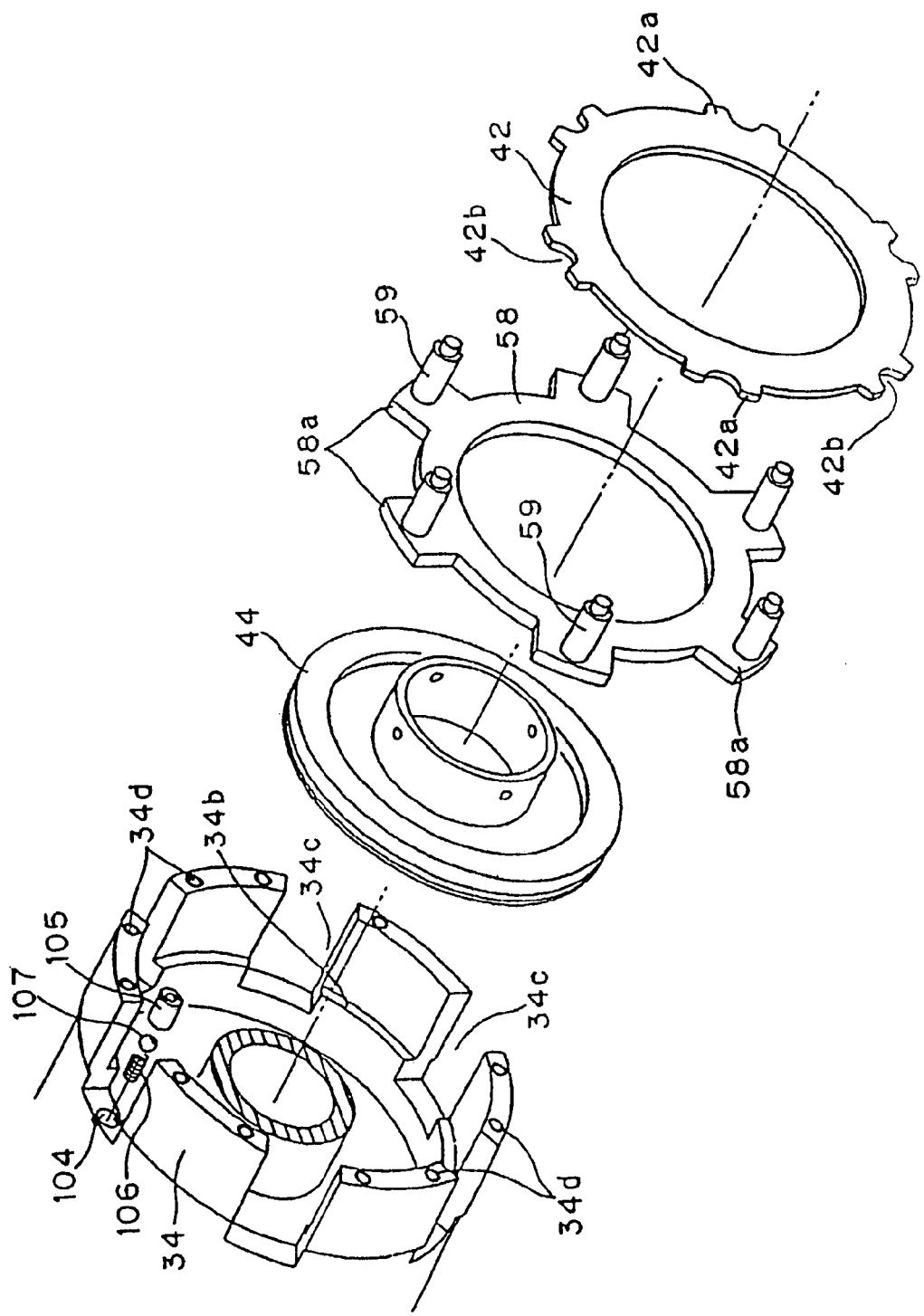
FIG. 4 is an exploded perspective view showing a part of a low-speed hydraulic clutch shown in FIGS. 2 and 3.

Furthermore, as shown in FIG. 4, the frictional element 42 supported by the clutch cylinder 34 includes a ring-like body frictionally engaging with the corresponding frictional element 41, and a plurality of fitting projections 42a extending outward in the radial direction from the body, to be fitted into the plurality of cutout holes 34c formed at the clutch cylinder 34. Each of the plurality of fitting projections 42a has a groove 42b opened outward in the radial direction. The groove 42b is fitted around the large-diameter portion of the interlocking rod 59, thereby preventing the frictional element 42 from being rotated about the clutch shaft.

Incidentally, the frictional element 41 supported by the boss of the gear 31 has, at the internal circumferential surface thereof, a spline gear 41a meshing with a spline gear formed at the boss, thereby preventing the frictional element 41 from being rotated on the clutch shaft.

With this configuration, the low-speed hydraulic clutch 35L is operated as follows.

The pressing plate 57 allows the frictional elements 41, 42 to engage with each other under pressure between the pressure receiving surface 34b of the clutch cylinder 34 and the same by the force generated by the disk spring 43 in a state in which no hydraulic effect exerts on the piston 44, thereby achieving the engagement of the low-speed hydraulic clutch 35L.

In contrast, when the hydraulic effect exerts on the piston 44, the piston 44 presses the operating plate 58, so that the pressing plate 57 compresses and moves the disk spring 43 in the direction remote from the frictional elements 41, 42 interlockingly with the movement of the operating plate 58. As a consequence, the engagement between the frictional elements 41, 42 is released, and thus, the low-speed hydraulic clutch 35L is turned into a disengagement state.

Next, description will be given below of the main transmission 18 as one example of the mechanical transmissions with reference to FIG. 1.

The main transmission 18 includes a plurality of gears 60, 61, 62, 63 (four gears in the embodiment shown in FIG. 1) supported in a rotatable manner relatively to the driving shaft 16, and a plurality of gears 64, 65, 66, 67 (four gears in the embodiment shown in FIG. 1) supported in a non-rotatable manner relatively to the transmission shaft 17 so as to operatively mesh with the plurality of gears 60, 61, 62, 63, respectively. Incidentally, in the present preferred embodiment, the gears 60 to 62 directly mesh with the gears 64 to 66, respectively; in contrast, the gears 63, 67 indirectly mesh with each other via an idler gear 68 pivoted by the bearing frame 5.

The main transmission 18 further includes a synchronous clutch 69 interposed between the gears 63, 61 on the driving shaft 16, and a synchronous clutch 70 interposed between the gears 60, 62 on the driving shaft 16.

With this configuration, the main transmission 18 is adapted to couple any one of the gears 60 to 63 to the driving shaft 16 by selectively operating the clutches 69, 70, thereby achieving transmissions of forward in first gear to forward in third gear and backward in first gear in the transmission shaft 17.

Incidentally, the transmission shaft 14 and the driving shaft 16 are connected to each other in a relatively non-rotatable manner about the axis by using one gear 33 of the high-low speed selector device 15 as a coupling member, as shown in, for example, FIG. 2.

Figure 5:
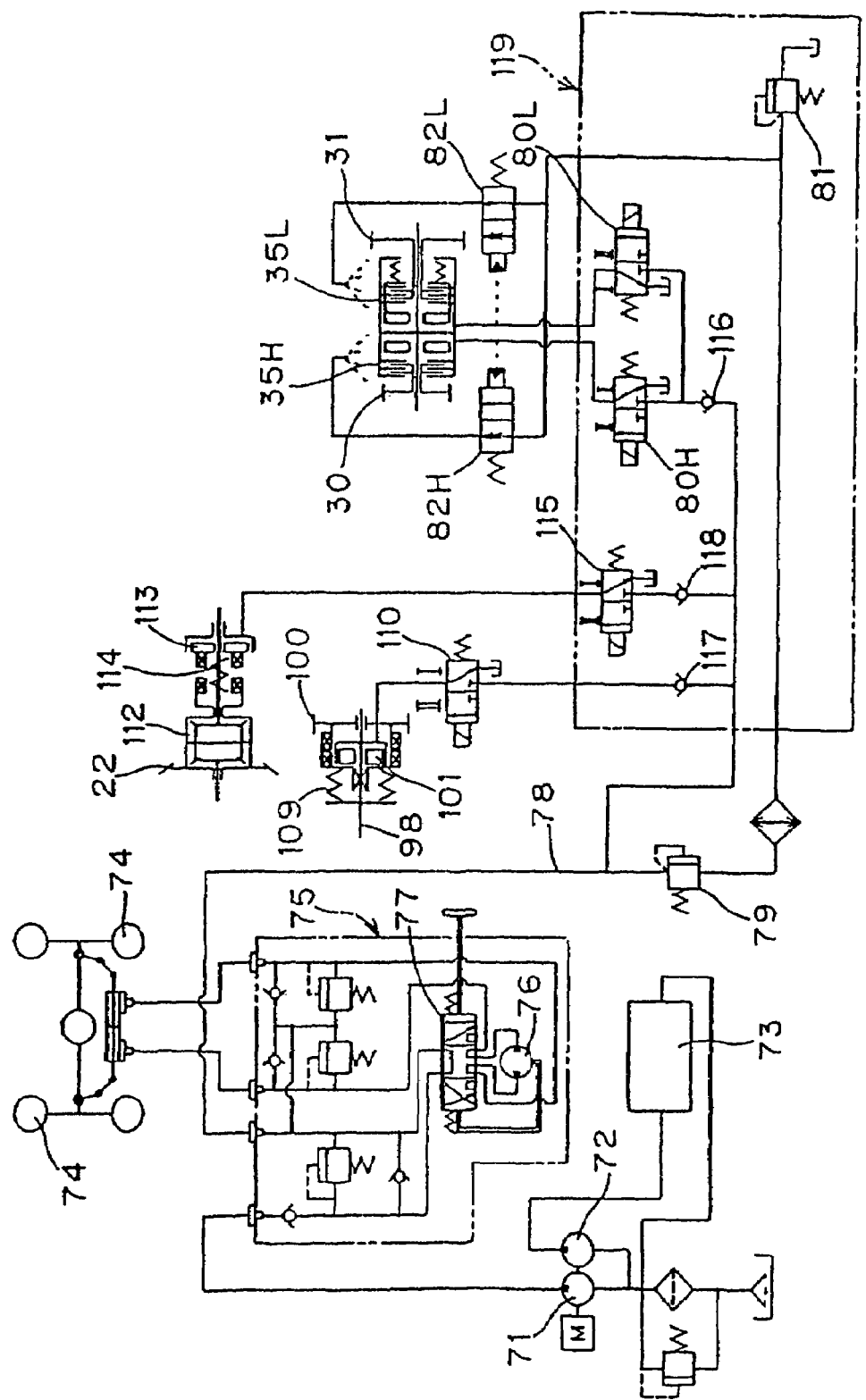
FIG. 5 is a diagram illustrating a hydraulic circuit of the tractor shown in FIG. 1.

Subsequently, description will be given below of a hydraulic circuit of the tractor provided with the transmission mechanism according to the present preferred embodiment. FIG. 5 is a diagram illustrating a hydraulic circuit of the tractor shown in FIG. 1.

The tractor includes two hydraulic pumps 71, 72, which are driven by an engine. The hydraulic pump 72 is adapted to supply pressurized oil to a valve mechanism 73 for the hydraulic lifter 29, and then, to return returning oil to a main circuit. In contrast, the other hydraulic pump 71 is designed to supply the pressurized oil to a metering motor 76 in a power steering mechanism 75 for turning right and left front wheels 74 via a direction switching valve 77, and further, to supply extra oil to the hydraulic clutches 35H, 35L or the like in the high-low speed selector device 15 via a circuit 78.

In particular, a main relief valve 79 is inserted into the circuit 78, so as to supply operating oil having an oil pressure set by the main relief valve to a circuit for the hydraulic clutch, which actuates the hydraulic clutches 35H, 35L.

The circuit for the hydraulic clutch is branched to a high-speed circuit for introducing the operating oil to the high-speed hydraulic clutch 35H and a low-speed circuit for introducing the operating oil to the low-speed hydraulic clutch 35L.

Into the high-speed circuit and the low-speed circuit are inserted electromagnetic direction switching valves 80H, 80L, respectively.

The electromagnetic direction switching valve 80H has a disengagement position I, at which the high-speed hydraulic clutch 35H is disengaged by draining the operating oil from the high-speed hydraulic clutch 35H, and an engagement position II, at which the high-speed hydraulic clutch 35H is engaged by supplying the operating oil to the high-speed hydraulic clutch 35H. In contrast, the electromagnetic direction switching valve 80L has an engagement position I, at which the low-speed hydraulic clutch 35L is engaged by draining the operating oil from the low-speed hydraulic clutch 35L, and a disengagement position II, at which the low-speed hydraulic clutch 35L is disengaged by supplying the operating oil to the low-speed hydraulic clutch 35L.

The circuit for the hydraulic clutch further includes a lubricant passage communicating with a secondary side of the main relief valve 79. The lubricant passage has a secondary relief valve 81 for setting a lubricant pressure, and a high-speed lubricant circuit and a low-speed lubricant circuit for introducing the lubricant to the hydraulic clutches 35H, 35L, respectively, at a pressure set by the secondary relief valve 81. The above-described flow rate control valve mechanisms 82H, 82L for controlling a lubricant flow rate according to the positions of the pistons 39, 44 are inserted into the high-speed lubricant circuit and the low-speed lubricant circuit, respectively.

Figure 6:
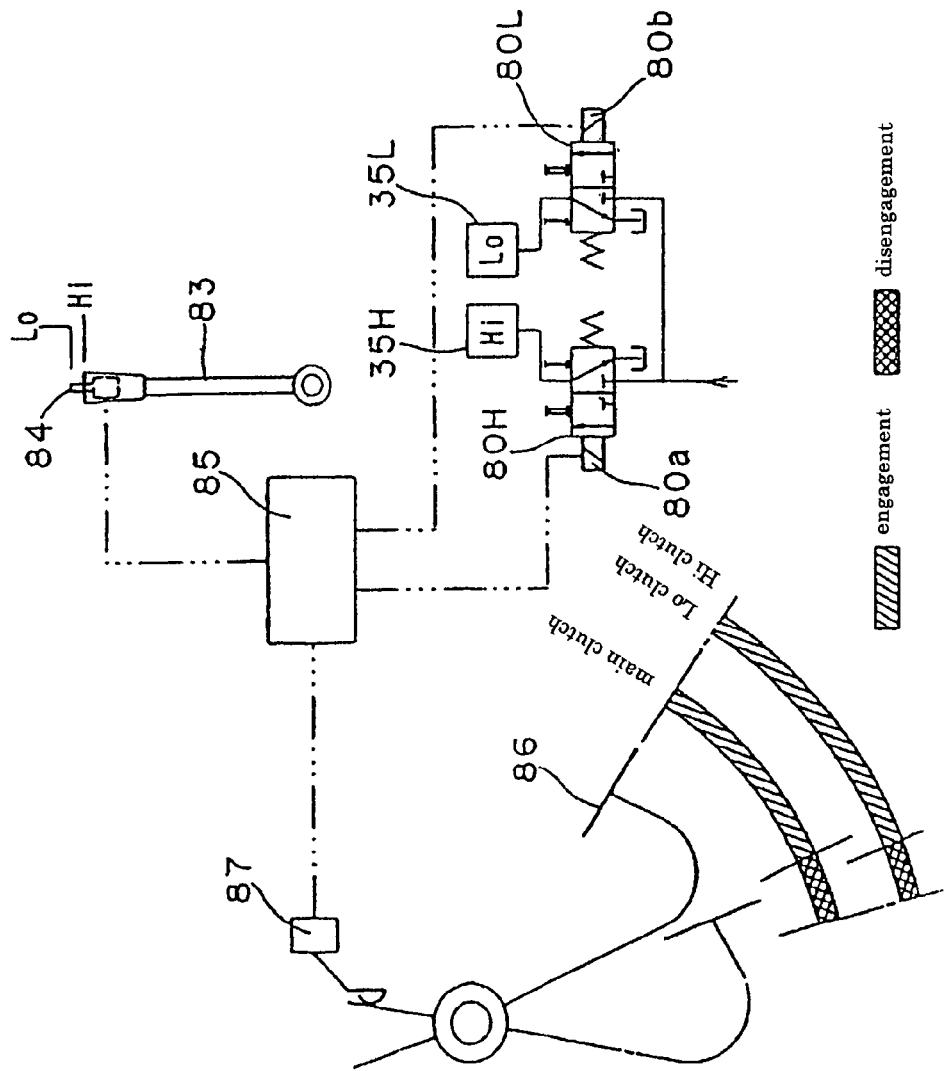
FIG. 6 is a schematic view showing a position control mechanism of an electromagnetic direction switching valve of the hydraulic circuit diagram illustrated in FIG. 5.

FIG. 6 is a view showing a position control mechanism for the above-described electromagnetic direction switching valves 80H, 80L.

As shown in FIG. 6, the high-low transmission 15 includes an operating lever 83. The operating lever 83 is provided at the upper end thereof with a pushbutton 84 which engages the low-speed hydraulic clutch 35L at a not-pressed position while engages the high-speed hydraulic clutch 35H at a pressed position.

The transmission lever 83 is connected to solenoids 80a, 80b in the electromagnetic direction switching valves 80H, 80L via a controller 85, respectively. At the not-pressed position of the pushbutton 84, both of the electromagnetic direction switching valves 80H, 80L take the position I, thereby engaging the low-speed hydraulic clutch 35L; in contrast, at the pressed position of the pushbutton 84, both of the electromagnetic direction switching valves 80H, 80L take the position II, thereby engaging the high-speed hydraulic clutch 35H.

The transmission mechanism according to the present preferred embodiment is further configured such that the main transmission 18 is disengaged interlockingly with the releasing operation by the main clutch 7.

In particular, the main clutch 7 of the traveling system is configured so as to be disengaged by a depressing operation of a pedal 86. The main clutch operating member 86 is provided with a pedal operation sensing switch 87 for turning on when an operating quantity (i.e., a depressing quantity) exceeds a predetermined value.

The pedal operation sensing switch 87 is also connected to the controller 85. Therefore, when the sensing switch 87 is turned on, the solenoid 80a is deenergized while the solenoid 80b is energized. As a result, the electromagnetic direction switching valve 80H is located at the position I while the electromagnetic direction switching valve 80L is located at the position II, so that both of the high-speed hydraulic clutch 35H and the low-speed hydraulic clutch 35L are disengaged at the same time.

More particularly, as shown in FIG. 6, the depressing position of the pedal 86 and the engagement and disengagement (cutting out) of the main clutch 7 and the low-speed hydraulic clutch 35L are designed such that the main clutch 7 first is completely disengaged by the depression of the pedal 86, and then, the low-speed hydraulic clutch 35L is disengaged.

Therefore, in contrast, in the case where a foot is separated from the pedal 86 to return the pedal 86, the low-speed hydraulic clutch 35L first is engaged, and then, the main clutch 7 is engaged.

The relationship between the depressing position of the pedal 86 and the engagement and disengagement of the main clutch 7 and the low-speed hydraulic clutch 35L is set in the above-described manner, so that the main clutch 7 is disengaged, and then, the low-speed hydraulic clutch 35L is disengaged during a vehicle traveling stopping operation during which the main clutch 7 is disengaged. Consequently, the hydraulic clutch 35L is not involved in the vehicle stopping operation. In contrast, the low-speed hydraulic clutch 35L is engaged, and then, the main clutch 7 is engaged during a vehicle starting operation during which the main clutch 7 is engaged. As a consequence, the hydraulic clutch 35L is not involved in the vehicle starting operation.

In this way, since the high-low speed selector device 15 is not involved in the vehicle stopping/starting operation, the capacity of each of the hydraulic clutches 35H, 35L is small, thereby constituting the high-low speed selector device 15 in a compact size.

Here, description will be given of the structure of other component parts in the tractor shown in FIG. 1.

The auxiliary transmission 21 is configured such that the propeller shaft 20 and the transmission shaft 17 are connected to each other directly or via the counter shaft 19, as shown in FIG. 1.

In particular, the counter shaft 19 is connected to the transmission shaft 17 via a train consisting of deceleration gears 88, 89. Furthermore, two gears 90, 91 are securely mounted on the counter shaft 19. A gear 93 operatively meshes with the gear 90 on a small-diameter side out of the two gears 90, 91 via a deceleration gear mechanism 92. Here, the gear 93 is disposed outside of the counter shaft 19.

The propeller shaft 20 includes a shift gear 94 in a slidable manner in the axial direction and in a non-rotatable manner relatively to the propeller shaft 20 so as to selectively mesh with the gear 93 or 90, a transmission gear 95 loosely fitted to the propeller shaft 20 so as to mesh with the stationary gear 91, and a multiple clutch 96 to be selectively slid at a position at which the transmission gear 95 is coupled to the propeller shaft 20 or at a position at which the propeller shaft 20 is connected directly to the transmission shaft 17.

The auxiliary transmission 21 having the above-described configuration allows the propeller shaft 20 to select a transmission ratio of four speed stages including a first speed stage (i.e., a creeping speed stage) which can be achieved by the mesh between the gears 93, 94, a second speed stage which can be achieved by the mesh between the gears 90, 94, a third speed stage which can be achieved by coupling the transmission gear 95 to the propeller shaft 20 by the multiple clutch 96, and a fourth speed stage which can be achieved by connecting the propeller shaft 20 directly to the transmission shaft 17 by the multiple clutch 96.

Moreover, a front wheel drive force taking-out gear 97 is securely disposed in the propeller shaft 20. A front wheel drive force taking-out case 99 provided with a power taking-out shaft 98 is detachably attached onto the bottom wall of the intermediate housing 2. The front wheel drive force taking-out gear 97 is operatively connected to a gear 100 loosely fitted to the power taking-out shaft 98 via the deceleration gear train. Additionally, a front wheel drive clutch 101 for selectively connecting the gear 100 to the power taking-out shaft 98 is accommodated inside of the front wheel drive force taking-out case 99.

As shown in FIG. 1, the PTO transmission 28 includes two transmission gear trains for independently connecting the transmission shaft 26 and the PTO shaft 27, and a multiple clutch 102 for selectively actuating the two transmission gear trains. In the present preferred embodiment, the multiple clutch 102 is mounted on the PTO shaft 27.

In the present preferred embodiment, the high-speed hydraulic clutch 35H is provided with a check valve 103 for preventing any simultaneous engagement of the hydraulic clutch 35H and the low-speed hydraulic clutch 35L, which may occur in the case where the piston 39 is moved toward the frictional elements 36, 37 by a centrifugally dynamic pressure effect when the hydraulic clutch 35H is disengaged (that is, the low-speed hydraulic clutch 35L is engaged).

Figure 7:
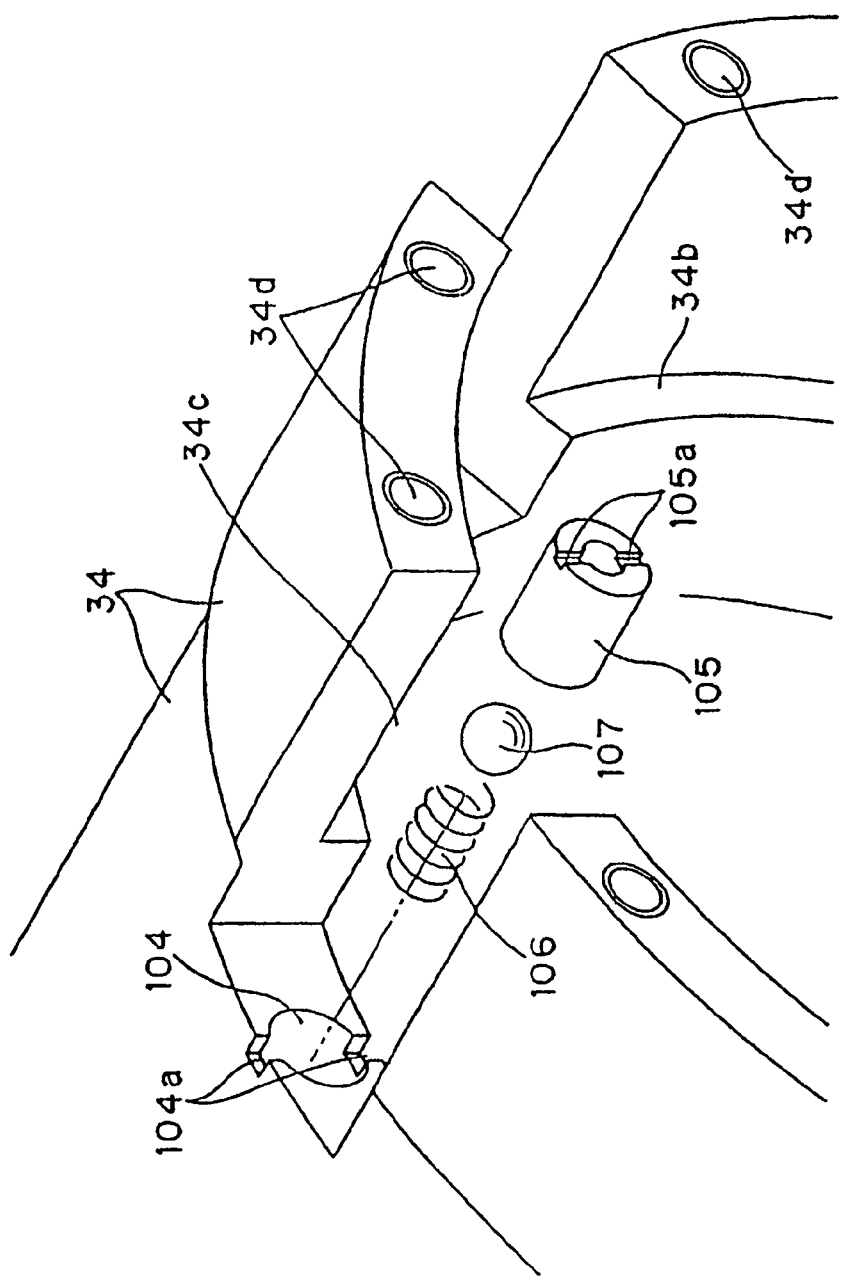
FIG. 7 is a perspective view showing, in enlargement, a part of the clutch shown in FIG. 4.

Particularly, the check valve 103 includes an axial hole 104 having a base end opened to a clutch axial end of the cutout hole 34c in the clutch cylinder 34 and having a tip end ended inside of the clutch cylinder 34, a hollow sleeve 105 fitted into the axial hole 104, a spring 106 interposed between the tip end of the axial hole 104 and the inner end of the sleeve 105, and a ball 107 seated at a valve seat formed at the inner end of the sleeve 105 by the spring 106, as shown in FIGS. 3 and 7.

The axial hole 104 is designed to communicate with a disposing space of the high-speed piston 39 via a groove 108 formed at the clutch cylinder 34.

The groove 108 allows the inside of the axial hole 104 and the high-speed piston disposing space to communicate with each other when the high-speed piston 39 slides toward the frictional elements 36, 37 by the hydraulic effect; in contrast, the groove 108 is closed by the high-speed piston 39 when the high-speed piston 39 is most separated from the frictional elements 36, 37 by the urging force of the return spring 38 after the hydraulic effect exerted on the high-speed piston 39 is stopped.

Moreover, an oil relief groove 105a for allowing the hollow portion and peripheral surface of the sleeve 105 to communicate with each other is formed at the sleeve 105. In the meantime, an oil relief 104a communicating with the oil relief groove 105a is formed at the clutch cylinder 34. In the present preferred embodiment, the oil relief grooves 105a, 104a are formed at the outer end of the sleeve 105 and at the base end of the axial hole 104, respectively.

The check valve 103 having the above-described configuration is operated as follows.

Specifically, assuming that the piston 39 is moved toward the frictional elements 36, 37 by a centrifugally dynamic pressure effect when the high-speed hydraulic clutch 35H is disengaged by releasing the effect of the pressurized oil acting on the high-speed piston 39 (see FIG. 3). With this movement of the high-speed piston 39, the high-speed piston disposing space communicates with the inside of the axial hole 104 via the groove 108. Consequently, the pressurized oil for pressing the high-speed piston 39 toward the frictional elements 36, 37 by the centrifugally dynamic pressure effect flows into the axial groove 108 through the high-speed piston disposing space.

Here, the valve seat formed at the inner end of the sleeve 105 is configured such that the ball 107 receives a centrifugal effect, to be slipped off from the valve seat outward in the radial direction when the pressurized oil does not substantially act on the ball 107. In other words, when no pressurized oil is supplied to the high-speed piston 39, the ball 107 is slipped off from the valve seat outward in the radial direction by the centrifugal force.

Consequently, the pressurized oil generated by the centrifugally dynamic pressure effect is relieved through the groove 108, the axial hole 104, the hollow portion of the sleeve 105 and the oil relief grooves 105a, 104a, thereby preventing any engagement of the frictional elements 36, 37 caused by the further movement of the high-speed piston 39.

In contrast, when the pressurized oil acts on the high-speed piston 39 by displacement of the electromagnetic direction switching valves 80H to the position II, the piston 39 is pressed toward the frictional elements 36, 37 by the effect of the pressurized oil. With this movement of the piston 39, the pressurized oil flows into the axial hole 104 through the groove 108, thereby allowing the ball 107 to be speedily seated at the valve seat (see a solid line in FIG. 3). As a consequence, the oil pressure acting on the piston 39 can be inhibited from being eliminated.

Incidentally, although the oil relief groove 104a is formed at the clutch cylinder 34 in the present preferred embodiment, the oil can be discharged through a clearance in the case where the clearance is provided against abrasion of the frictional elements 41, 42 between the cutout hole 34c formed at the clutch cylinder 34 and the fitting projection 58a formed at the operating plate 58, thereby making it sufficient to form only the oil relief groove 105a. Therefore, the oil relief groove 104a is not always required to be formed at the end of the hole 104.

As shown in FIG. 5, the circuit 78 is configured in such a manner as to apply the oil pressure to the hydraulic clutches 35H, 35L, and further, to supply the pressurized oil to the front wheel drive clutch 101 and a differential lock clutch 113 of a differential gear 112 for right and left rear wheels.

In particular, the front wheel drive clutch 101 is engaged by the force of a spring 109 while is disengaged by the effect of the pressurized oil. The circuit 78 is connected to the front wheel drive clutch 101 via an electromagnetic direction switching valve 110 having the engagement position I and the disengagement position II.

Furthermore, the differential lock clutch 113 is configured in such a manner as to be disengaged by the force of a spring 114 while to be engaged by the effect of the pressurized oil. The circuit 78 is connected to the differential lock clutch 113 via an electromagnetic direction switching valve 115 having the engagement position I and the disengagement position II.

Incidentally, the electromagnetic direction switching valves 80H, 80L for the hydraulic clutches 35H, 35L, respectively, the electromagnetic direction switching valve 115 for the differential lock clutch 113, the secondary relief valve 81 and three check valves 116, 117, 118 for allowing only an oil flow toward the electromagnetic direction switching valves 80H, 80L, 110, 115 are disposed in a valve housing 119 mounted on the outer surface of a side wall of the intermediate housing 1 inclusive of the oil passages therebetween.

Figure 8:
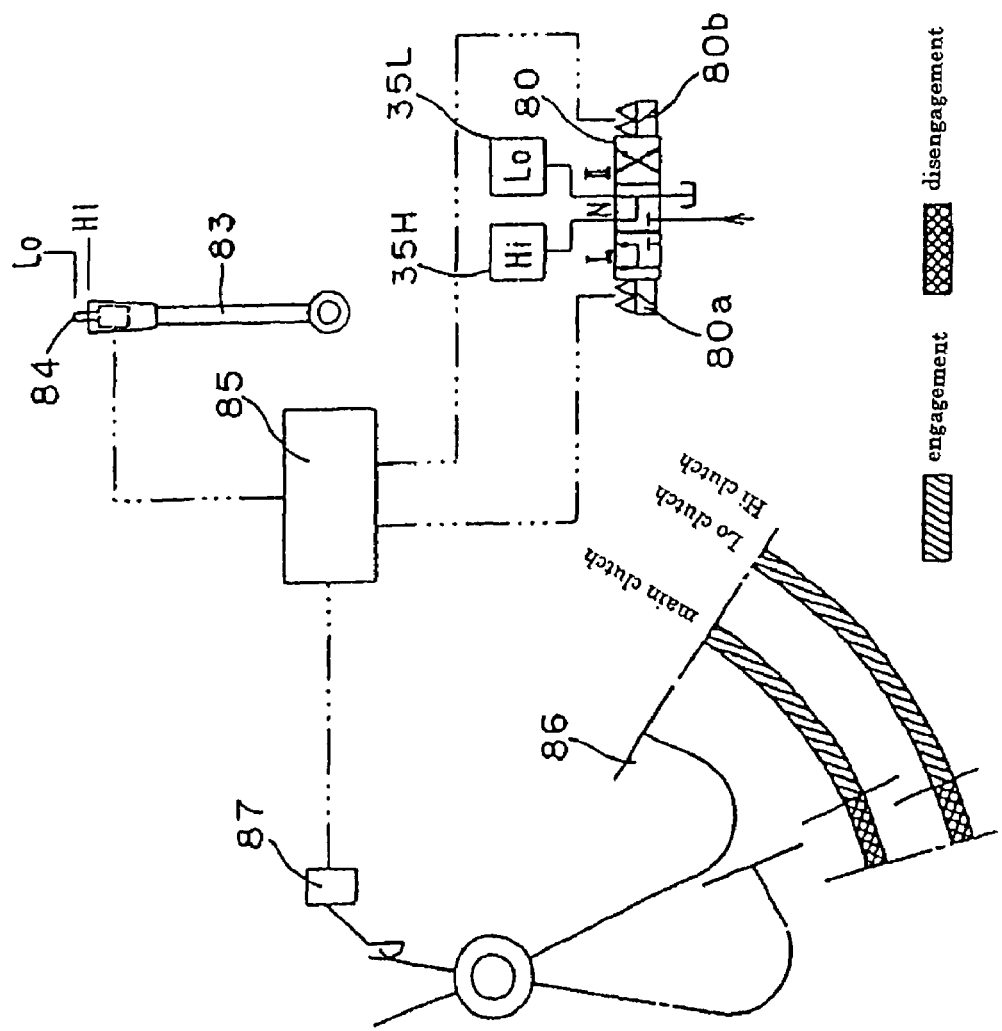
FIG. 8 is a schematic view showing a position control mechanism in a modification of an electromagnetic direction switching valve shown in FIG. 5.

FIG. 8 shows a modification in the case where a single electromagnetic direction switching valve 80 in place of the above-described two electromagnetic direction switching valves 80H, 80L for the hydraulic clutches 35H, 35L. The single electromagnetic direction switching valve 80 has a neutral position N, at which the oil pressures are drained from both of the hydraulic clutches 35H, 35L so as to engage the low-speed hydraulic clutch 35L, an acting position I, at which the oil pressures are applied to both of the hydraulic clutches 35H, 35L so as to engage the high-speed hydraulic clutch 35H, and an acting position II, at which the oil pressure is drained from the high-speed hydraulic clutch 35H while the oil pressure is applied to the low-speed hydraulic clutch 35L so as to disengage both of the hydraulic clutches 35H, 35L. The solenoids 80a, 80b in the electromagnetic direction switching valve 80 are connected to the controller 85 such that both of the solenoids 80a, 80b are deenergized at a not-pressing position of the pushbutton 84, and further, that the solenoid 80a is energized at a pressing position while the solenoid 80b is energized when the pedal operation sensing switch 87 is turned on by the pressing of the pedal 86.

Since the traveling transmission shown in FIGS. 1 to 8 according to the present invention is such configured as described above, the electromagnetic direction switching valve 80H takes the position I while the electromagnetic direction switching valve 80L takes the position II in the embodiment shown in FIGS. 5 and 6 when the main clutch 7 is disengaged in order to perform the speed change operation of the main transmission 18 of the mechanical type. In the meantime, in the modification shown in FIG. 8, the electromagnetic direction switching valve 80 takes the position II, and therefore, both of the high-speed hydraulic clutch 35H and the low-speed hydraulic clutch 35L are disengaged, thereby cutting off the power transmission by the high-low speed selector device 15, so that an inertial mass of the high-low speed selector device 15 cannot exert on the main transmission 18, thus speedily performing the speed change operation of the main transmission 18 in a situation in which no transmission shock or abnormal noise occurs.

Incidentally, although the high-low speed selector device 15 is used as the auxiliary transmission in the present preferred embodiment, a forward/backward selector device or a forward/backward selector device and a high-low speed selector device connected in series may be used as the auxiliary transmission.

Embodiment 2

Figure 9:
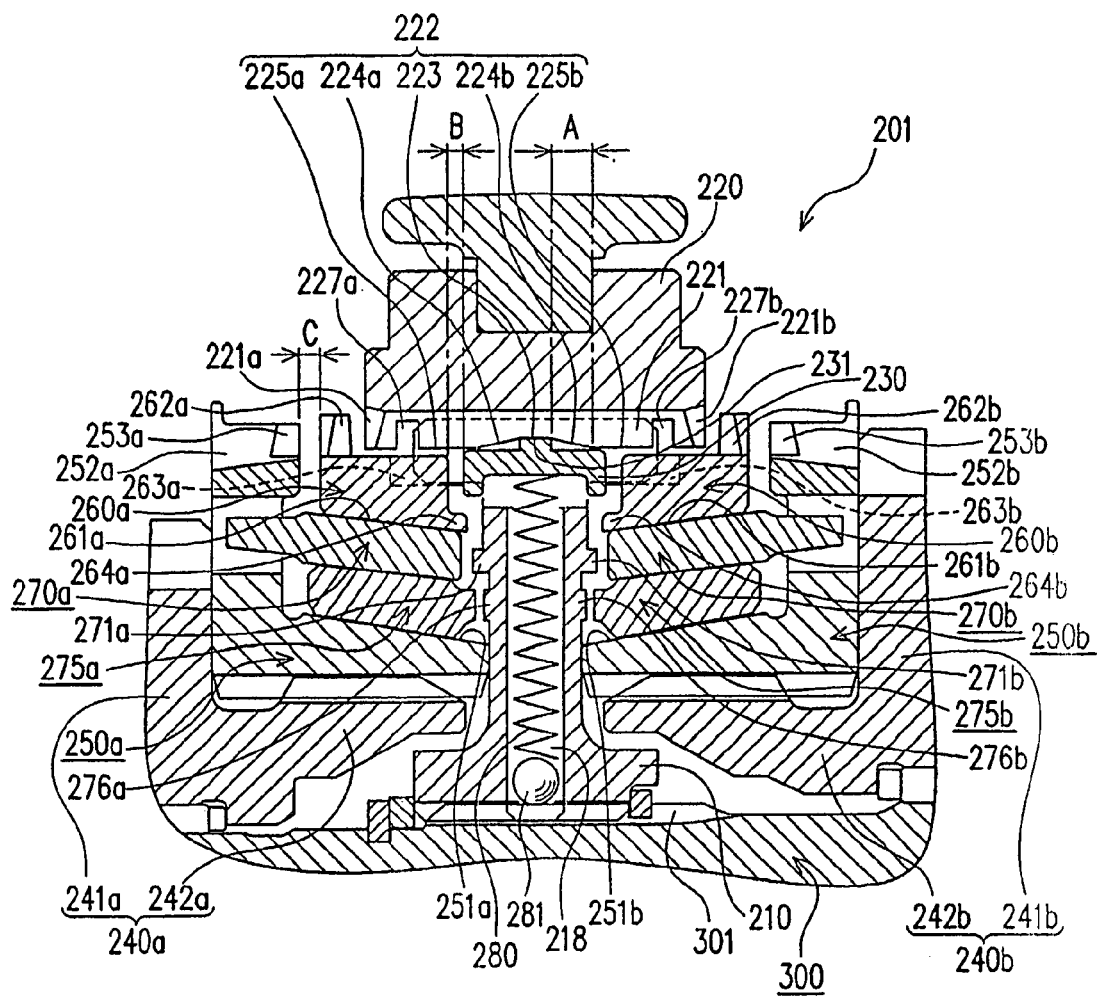
FIG. 9 is a longitudinal cross-sectional side view showing a synchronous gear device according to a second preferred embodiment of the present invention.
Figure 10:
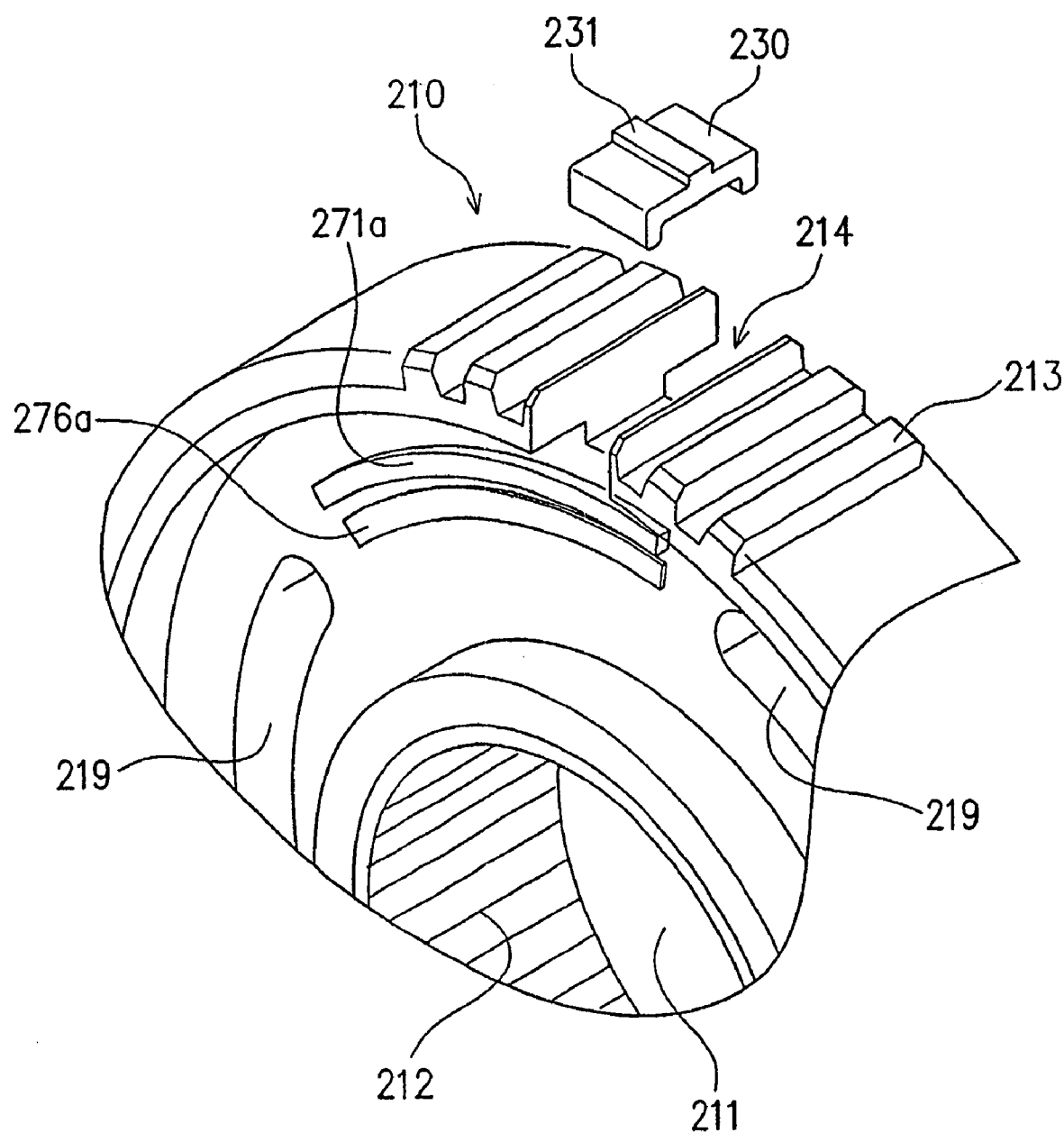
FIG. 10 is a partly perspective view showing the synchronous gear device shown in FIG. 9.

Hereinafter, description will be given of a synchronous gear device according to a preferred embodiment of a second aspect of the present invention with reference to the attached drawings. FIG. 9 is a longitudinal cross-sectional side view showing a synchronous gear device 201 according to the present preferred embodiment. Furthermore, FIG. 10 is a partly perspective view showing the synchronous gear device 201.

As shown in FIG. 9, the synchronous gear device 201 according to the present preferred embodiment comprises a clutch hub 210, a sleeve 220, an index key 230, first and second gears 240a, 240b disposed on one side and the other side in the axial direction of the clutch hub 210, first and second synchronized cones 250a, 250b interposed between the clutch hub 210 and the first and second gears 240a, 240b, respectively, first and second synchronizer rings 260a, 260b interposed between the clutch hub 210 and the first and second synchronized cones 250a, 250b, respectively, and an urging member 280.

The clutch hub 210 is supported in a non-rotatable manner relatively to one shaft 300 (hereinafter referred to as a transmission shaft) out of a driving shaft and a driven shaft, and in a non-slidable manner in an axial direction.

In particular, the clutch hub 210 is constituted of a ring-like member having a center hole 211, into which the transmission shaft 300 is inserted. The clutch hub 210 is provided at the inner or circumferential surface of the center hole 211 with an inner spline 212 to be fitted to a spline 301 disposed at the peripheral surface of the transmission shaft 300, and further, at the outer or peripheral surface of the center hole 211 with an outer spline 213 to be fitted to the sleeve 220.

The sleeve 220 is constituted of a ring-like member having an inner spline 221 to be fitted to the outer spline 213 of the clutch hub 210. The sleeve 220 is fitted in a non-rotatable manner relatively to the clutch hub 210 and in a slidable manner in the axial direction.

At the inner spline 221 of the sleeve 220 is formed a circumferential surface 222 to be fitted around a projection, described later, of the index key 230. The circumferential surface 222 of the sleeve 220 will be described later.

The index key 230 is interposed between the clutch hub 210 and the sleeve 220 in a non-rotatable manner relatively to the clutch hub 210 and in a movable manner in the axial direction.

In particular, the index key 230 is contained inside of a cutout 214 formed at the periphery of the clutch hub 210 along the axial direction.

The index key 230 has a projection 231 projecting outward in the radial direction. The projection 231 is fitted to the circumferential surface 22 of the sleeve 20.

Each of the first and second gears 240a and 240b is operatively connected to the other shaft of the driving shaft and the driven shaft. In other words, the synchronous gear device 201 in the present preferred embodiment is configured such that the clutch hub 210 is selectively connected to the first or second gear 240a or 240b by moving the sleeve 220 onto one side or the other side in the axial direction.

In the present preferred embodiment, each of the first and second gears 240a, 240b is loosely fitted to the transmission shaft 300.

The first gear 240a has a main body 241a having a chamfer at the peripheral surface thereof and a spline portion 242a extending in a direction approximate to the clutch hub 210 from the main body 241a.

The second gear 240b has a pitch diameter different from that of the first gear 240a. The second gear 240b also has a main body 241b and a spline portion 242b in the same manner.

The first synchronized cone 250a is connected in a non-rotatable manner relatively to the first gear 240a via the spline portion 242a of the first gear 240a, and is fixed in a non-slidable manner in the axial direction by the first gear 240a and the clutch hub 210.

The first synchronized cone 250a has a tapered peripheral frictional surface 251a, and a spline 252a located outward in the radial direction beyond the tapered peripheral frictional surface 251a. The spline 252a of the first synchronized cone 250a is configured in such a manner as to mesh with the inner spline 21 of the sleeve 220. Incidentally, reference numeral 253a in FIG. 9 designates a chamfer formed at the inner end in the axial direction of the spline 252a.

Otherwise, the first synchronized cone 250a may be formed integrally with the first gear 240a.

The second synchronized cone 250b is connected in a non-rotatable manner relatively to the second gear 240b via the spline portion 242b of the second gear 240b, and is fixed in a non-slidable manner in the axial direction by the second gear 240b and the clutch hub 210.

Similarly, the second synchronized cone 250b has a tapered peripheral surface 251b, and a spline 252b located outward in the radial direction beyond the tapered peripheral frictional surface 251b. The spline 252b of the second synchronized cone 250b is configured in such a manner as to mesh with the inner spline 221 of the sleeve 220.

Incidentally, reference numeral 253b in FIG. 9 designates a chamfer formed at the inner end in the axial direction of the spline 252b.

Otherwise, the second synchronized cone 250b may be formed integrally with the second gear 240b.

The first synchronizer ring 260a is constituted of a ring-like member having a tapered circumferential frictional surface 261a facing to the tapered peripheral frictional surface 251a of the first synchronized cone 250a.

The first synchronizer ring 260a is designed to be rotatable relatively to the clutch hub 210 within a predetermined range in the circumferential direction while to be movable along the axial direction between an axially inward position approximate to the clutch hub 210 and an axially outward position remote from the clutch hub 210.

Particularly, in the first synchronizer ring 260a, the tapered circumferential frictional surface 261a is formed at the circumferential surface, and further, a chamfer 262a extending outward in the radial direction at the axial outer end and a fitting projection 263a exposed to the inside of the cutout 214 of the clutch hub 210 are formed at the peripheral surface.

The fitting projection 263a is formed in a circumferential width smaller than the cutout 214. Consequently, the first synchronizer ring 260a becomes rotatable relatively to the clutch hub 210 within a predetermined range in the circumferential direction.

Although the details will be described later, the chamfer 262a faces to the spline 221 of the sleeve 220 when the first synchronizer ring 260a is located at a first position in the circumferential direction (i.e., in an index key state) with respect to the clutch hub 210; in contrast, the chamfer 262a can engage with the spline 221 of the sleeve 220 when the first synchronizer ring 260a is located at a second position in the circumferential direction with respect to the clutch hub 210.

Incidentally, reference numeral 264a in FIG. 9 designates a projection, which is fitted to one surface in the axial direction of the clutch hub 210 so as to define the axially inward position of the first synchronizer ring 260a.

The tapered circumferential frictional surface 261a is configured in such a manner as to be operatively frictionally fitted to the tapered peripheral frictional surface 251a of the first synchronized cone 250a when the first synchronizer ring 260a is located at the axially outward position.

Namely, the tapered circumferential frictional surface 261a of the first synchronizer ring 260a is inclined at a tapering angle different from that of the tapered peripheral frictional surface 251a of the first synchronized cone 250a, such that the tapered circumferential frictional surface 261a of the first synchronizer ring 260a is configured in such a manner as to be operatively frictionally fitted to the tapered peripheral frictional surface 251a of the first synchronized cone 250a as the first synchronizer ring 260a is moved toward the axially outward position.

In the present preferred embodiment, a first outside intermediate cone ring 270a and a first inside intermediate cone ring 275a are interposed between the first synchronizer ring 260a and the first synchronized cone 250a.

The first outside intermediate cone ring 270a and the first inside intermediate cone ring 275a are connected to the first synchronized cone 250a and the clutch hub 210, respectively, in a relatively non-rotatable manner. The first inside intermediate cone ring 275a is fitted to a circumferential groove 219 formed at the clutch hub 210 so as to be non-rotatable relative to the clutch hub 210.

In this manner, a substantial contact area between the first synchronizer ring 260a and the first synchronized cone 250a can be enlarged so as to increase the frictional force to be generated therebetween by interposing a pair or a plurality pair of intermediate cone rings between the first synchronizer ring 260a and the first synchronized cone 250a.

Preferably, a projection 271a defining an axially inward position of the first outside intermediate cone ring 270a may be formed at either one or both of portions, at which the first outside intermediate cone ring 270a and the clutch hub 210 face to each other.

In the same manner, a projection 276a defining an axially inward position of the first inside intermediate cone ring 275a may be formed at either one or both of portions, at which the first inside intermediate cone ring 275a and the clutch hub 210 face to each other.

In this way, the axially movable ranges of the first outside intermediate cone ring 270a and the first inside intermediate cone ring 275a can be independently set by independently defining the axially inward positions of the first outside intermediate cone ring 270a and the first inside intermediate cone ring 275a, thereby effectively achieving the frictional effect of the first outside intermediate cone ring 270a and the first inside intermediate cone ring 275a.

In other words, the first outside intermediate cone ring 270a and the first inside intermediate cone ring 275a have the tapered frictional surfaces at different tapering angles. Consequently, the first outside intermediate cone ring 270a and the first inside intermediate cone ring 275a have different axially outward positions at which the frictional effect is exhibited. However, the axially outward positions can be efficiently set by independently setting the axially inward positions, as described above.

The second synchronizer ring 260b has substantially the same configuration as that of the first synchronizer ring 260a except that it is configured such that it operatively frictionally engages with the second synchronized cone 250b. As a consequence, in FIG. 9, the same reference numerals attached with a character "b" designate component parts, and therefore, the detailed description on the second synchronizer ring 260b will be omitted below.

The urging member 280 is configured such that the index key 230 is pressed toward the circumferential surface 222 of the sleeve 220.

In the present preferred embodiment, at the clutch hub 210 is formed a radial hole 218, which is opened at the inner end thereof to the center hole 211 formed at the clutch hub 210 while is opened at the outer end thereof to the cutout 214 formed at the clutch hub 210. A spring acting as the urging member 280 is contained inside of the radial hole 218.

Figure 11:
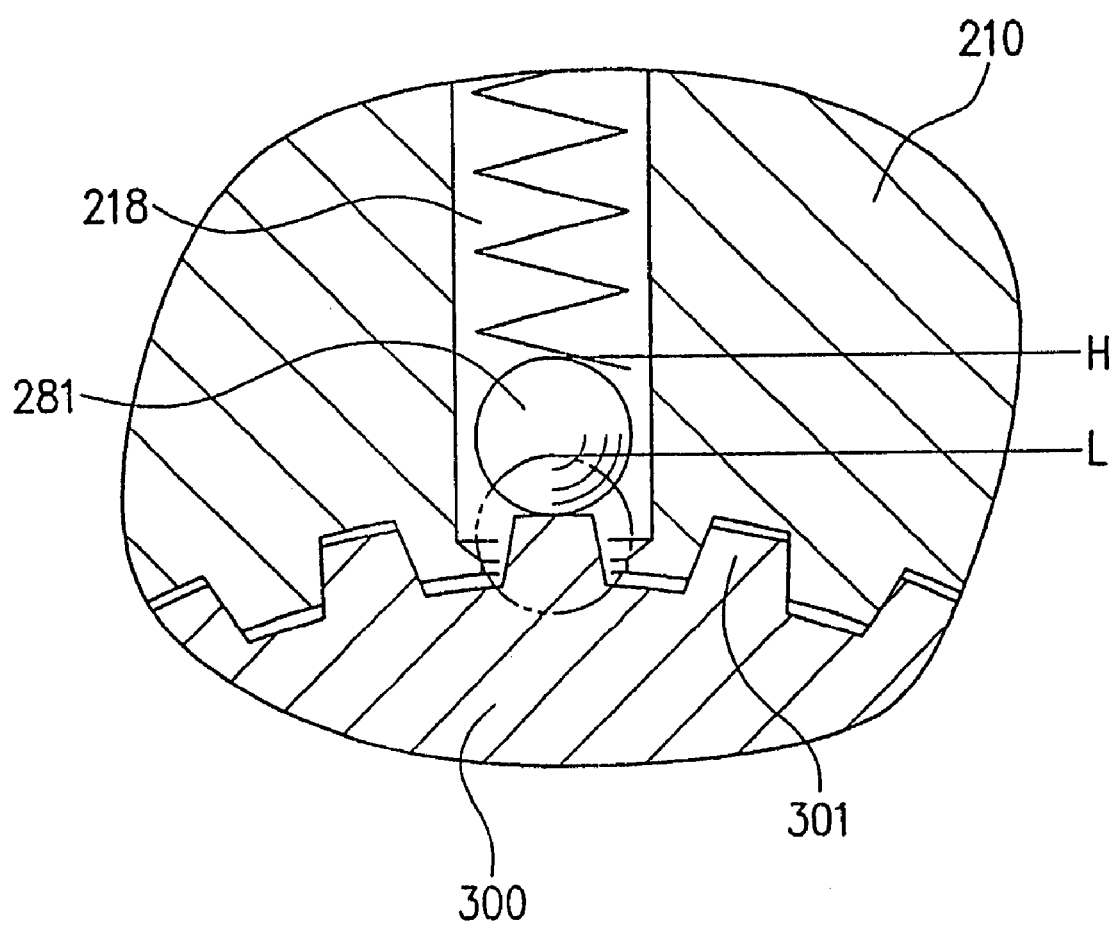
FIG. 11 is a partly enlarged cross-sectional view showing a method for incorporating an urging member in the synchronous gear device shown in FIGS. 9 and 10.

FIG. 11 is a partly enlarged cross-sectional view showing the vicinity of the inner end of the radial hole 218.

As shown in FIGS. 9 and 11, the radial hole 218 has a first diameter at the center and outer end thereof, and further, a second diameter smaller than the first diameter at the inner end thereof.

At the inner end of the radial hole 218 is disposed a ball 281 having a diameter smaller than the first diameter and larger than the second diameter. The spring is contained in the radial hole 218 in such a manner as to be brought into contact with the ball 281 at a base end. The inner end of the radial hole 218 is opened to the center hole 211 of the clutch hub 210 at a position facing to the projection of the spline 301 in the transmission shaft 300 when the clutch hub 210 is spline-coupled to the transmission shaft 300.

In this manner, the present preferred embodiment is configured such that the base end position of the spring acting as the urging member 280 is located at a first position L in the radial direction before the clutch hub 210 is spline-coupled to the transmission shaft 300, and that the spring is moved from the first position L in the radial direction to a second position H outward in the radial direction after the clutch hub 210 is spline-coupled to the transmission shaft 300, thereby achieving the efficiency of an assembling work.

That is to say, the urging member 280 presses the index key 230 against the circumferential surface 222 of the sleeve 220 all the time. Consequently, the index key 230 and the sleeve 220 need be incorporated to the clutch hub 210 in a state that the urging member 280 is compressed with a compression quantity having a retention resiliency more than a predetermined value (hereinafter, referred to as a first compression quantity).

In this regard, with the above-described configuration, the index key 230 and the sleeve 220 can be incorporated in the clutch hub 210 while compressing the urging member 280 by a quantity obtained by subtracting a movement quantity of the base end of the urging member (i.e., a distance between the first position L and the second position H) from the first compression quantity or while keeping a natural length of the urging member 280.

Since the base end of the urging member 280 is moved to the second position H outward in the radial direction by spline-coupling the clutch hub 210 having the index key 230 and the sleeve 220 incorporated therein to the transmission shaft 300, the urging member 280 is compressed by the first compression quantity.

Here, detailed description of the circumferential surface 222 of the sleeve 220 will be given below.

The circumferential surface 222 of the sleeve 220 has a recess including a deepest portion 223 most apart outward in the radial direction from the transmission shaft 300, and first and second inclining portions 224a, 224b, which are inclined inward in the radial direction from the deepest portion 223 toward one side and the other side in the axial direction, respectively.

Each of the deepest portion 223 and the inclining portions 224 of the recess is configured in such a manner as to be selectively fitted to the projection 231 formed at the index key 230.

An axial length A of the inclining portion 224 is set to become greater than an axial distance B, by which the index key 230 is moved from the neutral position when the synchronizer ring 260 is moved to the axially outward position.

An effect presented by setting the axial length A of the inclining portion in the above-described manner will be described below with reference to FIGS. 12 to 17.

Incidentally, FIGS. 12 to 17 illustrate, in time sequence, states in which the sleeve 220 is moved to an engagement position such that the transmission shaft 300 is to be operatively connected to the first gear 240a rotated by the inertia force of the operatively connected drive wheel, and thereafter, the sleeve 220 is returned to the neutral position in the case where the transmission shaft 300 is disposed on the drive side while the first and second gears 240a and 240b are disposed on the driven side.

Figure 12A:
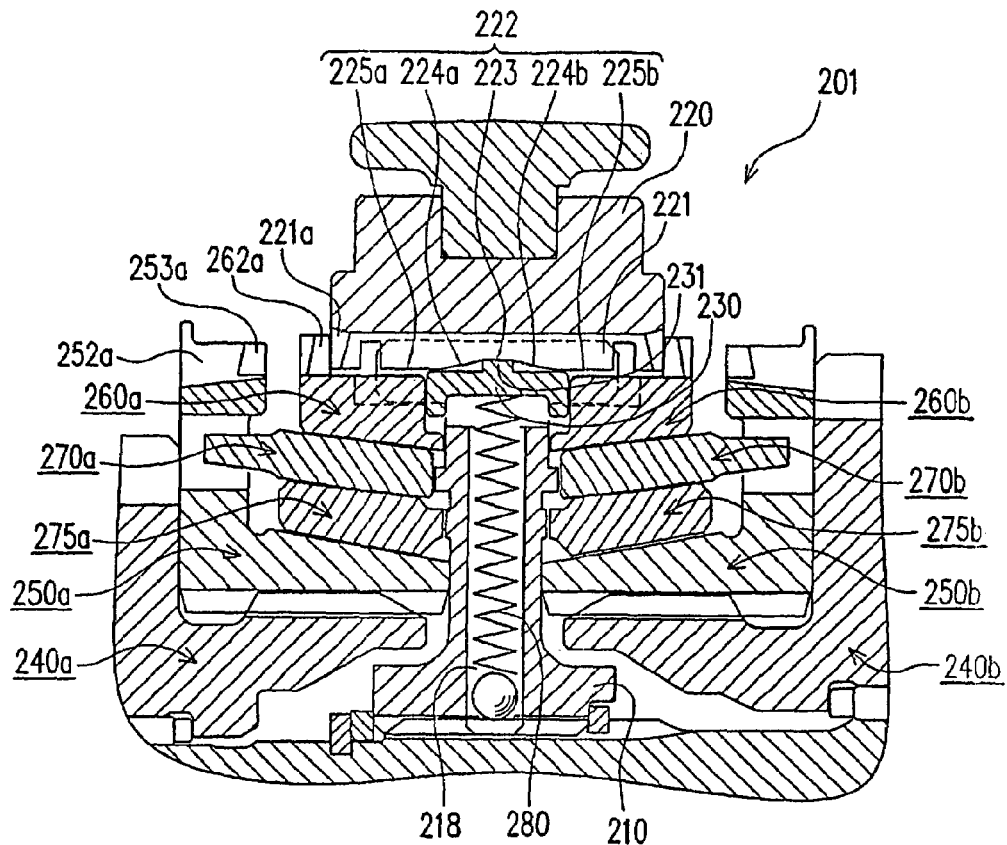
FIG. 12($a$) is a longitudinal cross-sectional side view showing the synchronous gear device shown in FIGS. 9 and 10, in a state in which a sleeve is located at a neutral position.
Figure 12B:
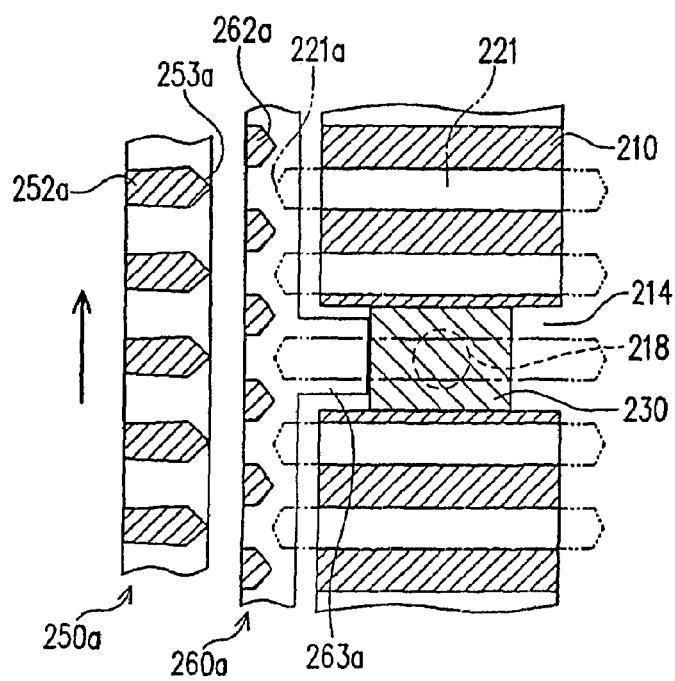

In a reference state shown in FIGS. 12(a) and 12(b), the sleeve 220 is located at the neutral position, at which the deepest portion 223 at the circumferential surface 222 of the sleeve 220 is located at the center in the axial direction. Furthermore, the index key 230 also is located at the neutral position, at which the projection 231 is located at the center in the axial direction, by pressing the projection 231 against the deepest portion 223 by the urging force of the urging member 280.

Incidentally, in FIGS. 12(a) and 12(b), the first and second synchronizer rings 260a and 260b are located at the axially inward position.

An arrow shown in FIG. 12 indicates the rotation direction of the first gear 240a and the first synchronized cone 250a, which are rotated by the inertia of the drive wheel (hereinafter, referred to as "a first direction").

Figure 13A:
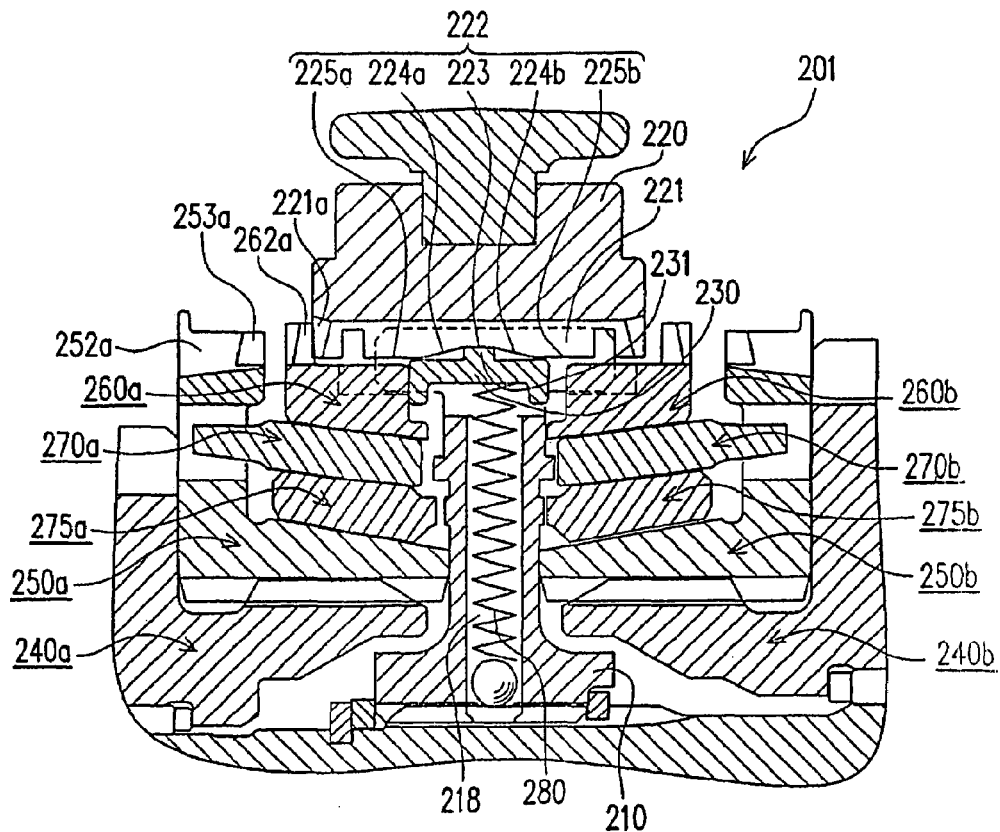
FIG. 13($a$) is a longitudinal cross-sectional side view showing the synchronous gear device shown in FIGS. 9 and 10, in a state in which the synchronizer ring is pressed to a position at which the synchronizer ring frictionally engages with a synchronized cone by moving the sleeve toward one side in an axial direction from the neutral position.
Figure 13B:
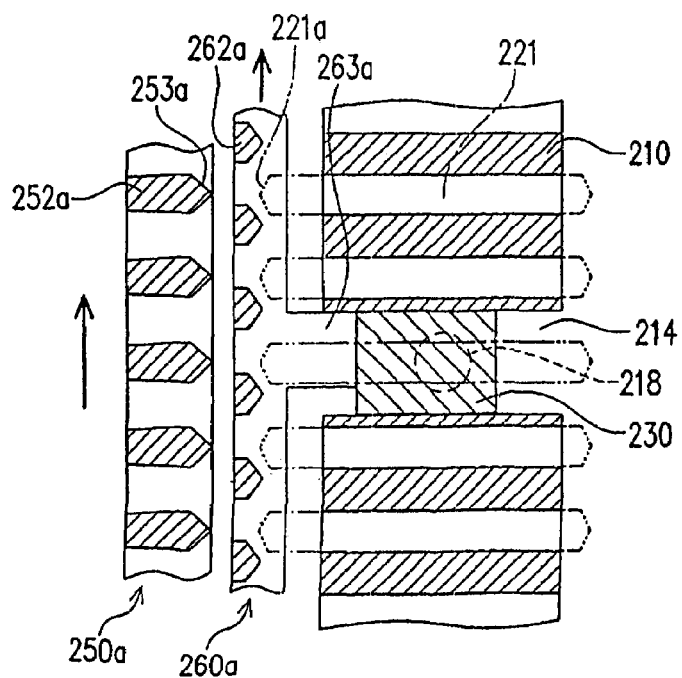

When the sleeve 220 is moved from the above-described reference state onto one side in the axial direction, the index key 230 also is moved onto the one side in the axial direction together with the sleeve 220 by the urging force of the urging member 280 in the state in which the projection 231 is fitted to the deepest portion 223, thereby pressing the first synchronizer ring 260a from the axially inward position to the axially outward position (see FIG. 13). Consequently, the tapered circumferential frictional surface 261a of the first synchronizer ring 260a is started to operatively frictionally engage with the corresponding tapered peripheral frictional surface 251a of the first synchronized cone 250a. Incidentally, in the present preferred embodiment, the first synchronizer ring 260a and the first synchronized cone 250a frictionally engage with each other via the pair of intermediate cone rings 270a and 275a.

At this time, the first synchronizer ring 260a follows the first synchronized cone 250a, to be thus rotated in the first direction, as indicated by an arrow shown in FIG. 13. That is to say, the first synchronizer ring 260a is rotated by a clearance defined between the fitting projection 263a and the cutout 214 in the first direction with respect to the sleeve 220.

Specifically, in the state shown in FIG. 13, the first synchronizer ring 260a is located at a first position in the circumferential direction with respect to the clutch hub 210. In this state, the chamfer 262a of the first synchronizer ring 260a faces to the chamfer 221a of the sleeve 220, so that the spline 221 of the sleeve 220 is turned into an index state in which the spline 221 cannot engage with the chamfer 262a of the first synchronizer ring 260a.

Figure 14A:
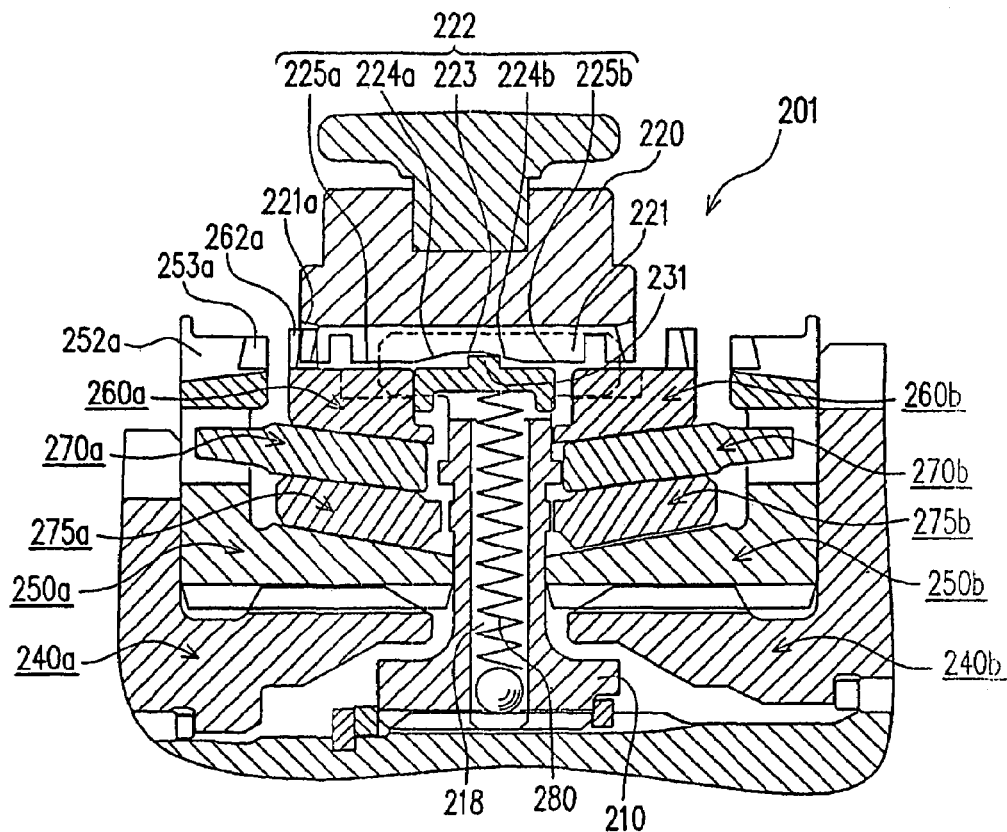
FIG. 14($a$) is a longitudinal cross-sectional side view showing the synchronous gear device shown in FIGS. 9 and 10, in a state in which a spline of the sleeve meshes with a chamfer in the synchronized cone by further moving the sleeve toward one side in the axial direction from the position shown in FIG. 13.
Figure 14B:
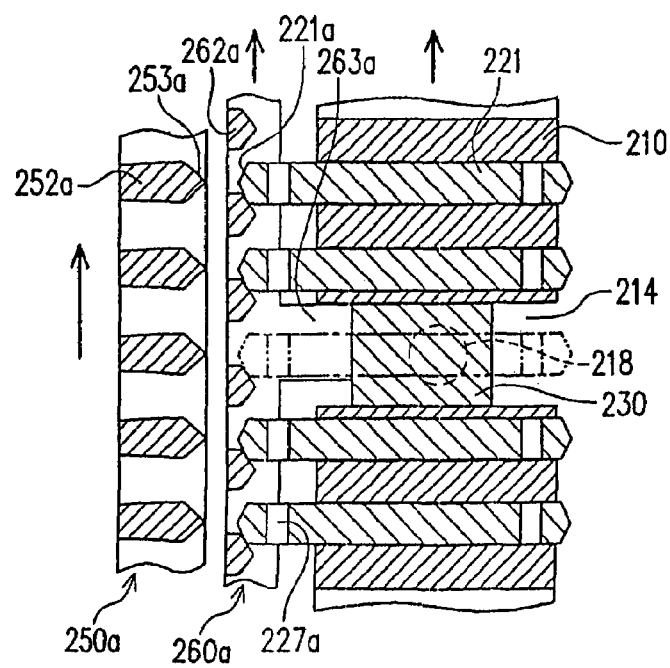

When the sleeve 220 is further moved onto the one side in the axial direction in the above-described state, the pressing force of the index key 230 against the first synchronizer ring 260a is increased, and further, the chamfer 221a of the sleeve 220 is brought into contact with the chamfer 262a of the first synchronizer ring 260a. As a consequence, the frictional torque between the first synchronizer ring 260a and the first synchronized cone 250a is increased, and finally, the first synchronizer ring 260a and the first synchronized cone 250a are started to be rotated in synchronism with each other (see FIG. 14). At this time, the index key 230 is inhibited from being moved onto the one side in the axial direction by the first synchronizer ring 260a. Therefore, the sleeve 220 is moved onto the one side in the axial direction relatively to the index key 230 while pressing the index key 230 against the urging force of the urging member 280 inward in the radial direction. Namely, as shown in FIG. 14, in the state in which the chamfer 221a of the sleeve 220 is brought into contact with the chamfer 262a of the first synchronizer ring 260a, the projection 31 of the index key 230 is fitted to the second inclining portion 224b of the sleeve 220.

Upon completion of the synchronization between the first synchronizer ring 260a and the first synchronized cone 250a, the frictional torque generated therebetween is dissipated. Therefore, when the sleeve 220 is further moved onto the one side in the axial direction, the chamfer 221a of the sleeve 220 can push up the chamfer 262a of the first synchronizer ring 260a. Namely, the first synchronizer ring 260a is relatively rotated in a direction reverse to the first direction with respect to the sleeve 220, so as to mesh with the spline 221 of the sleeve 220, and thus, is located at a second position in the circumferential direction with respect to the clutch hub 210.

Figure 15A:
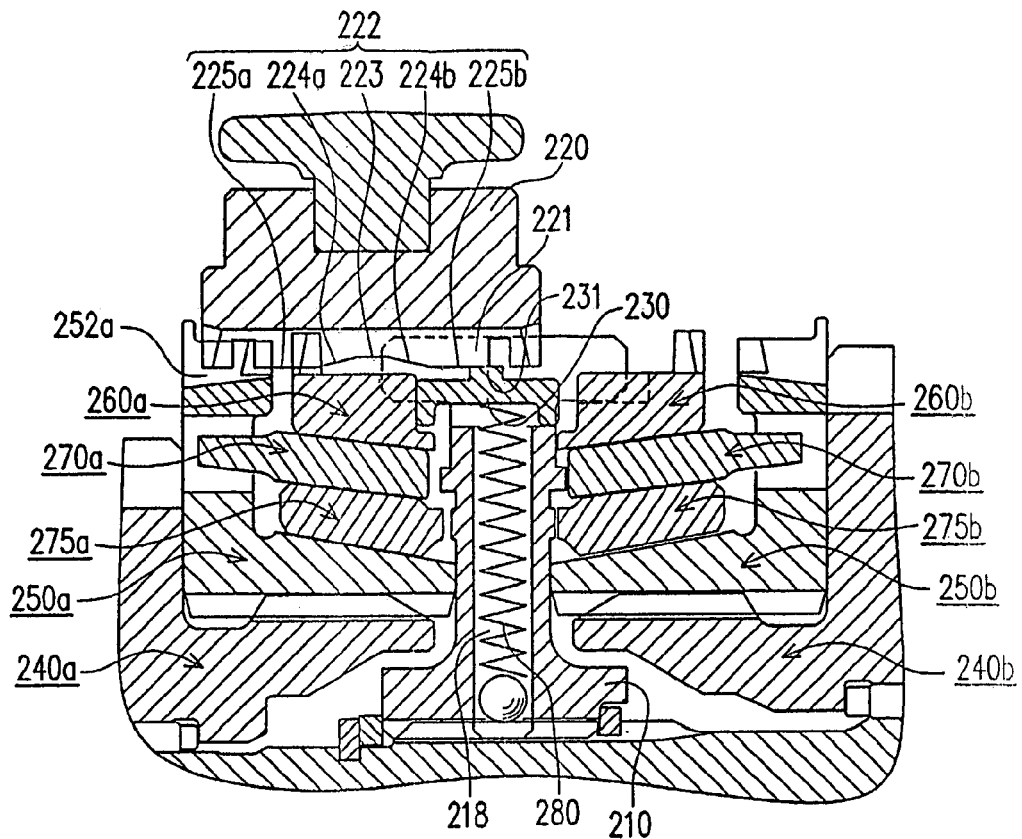
FIG. 15($a$) is a longitudinal cross-sectional side view showing the synchronous gear device shown in FIGS. 9 and 10, in a state in which the spline of the sleeve meshes with a chamfer of the gear by further moving the sleeve toward one side in the axial direction from the position shown in FIG. 14.
Figure 15B:
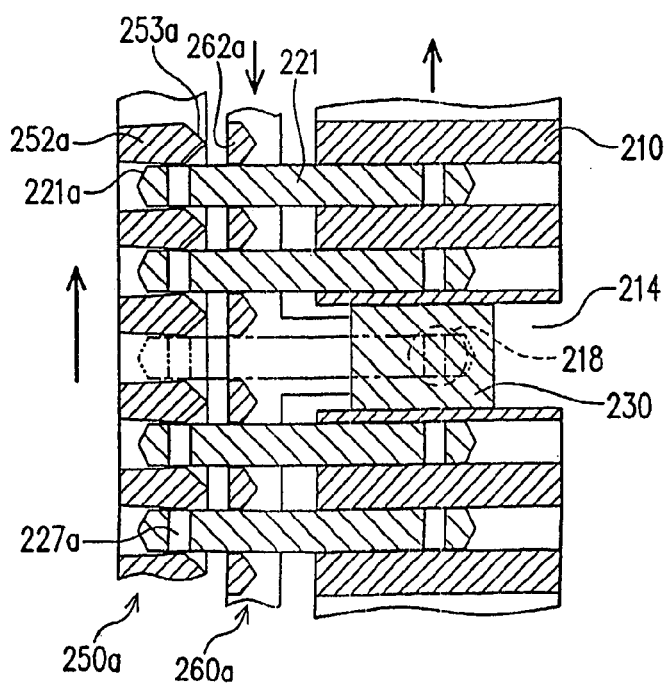

As a consequence, when the sleeve 220 is further moved onto the one side in the axial direction, the spline 221 of the sleeve 220 passes the chamfer 262a of the first synchronizer ring 260a, to thus engage with the chamfer 253a of the first synchronized cone 250a, so that the synchronous gear device 1 is turned into a first transmission state, in which the transmission shaft 300 is connected to the first gear 240a (see FIG. 15).

At this time, since the first synchronizer ring 260a keeps inhibiting the index key 230 from being moved onto the one side in the axial direction, only the sleeve 220 is moved onto the one side in the axial direction. Therefore, in the first transmission state, the projection 231 of the index key 230 is fitted to a second horizontal portion 225b of the sleeve 220, as shown in FIG. 15.

It is preferable that a stopper groove 227a to be fitted to a corner of the chamfer 253a of the first synchronized cone 250a in the first transmission state should be formed at a first horizontal portion 225a.

The formation of such a stopper groove 227a can effectively prevent an accidental disengagement from the first transmission state.

Next, description will be given below of transition from the first transmission state to a neutral state.

The projection 231 of the index key 230 is pressed against the second horizontal portion 225b by the urging force of the urging member 280. Consequently, when the sleeve 220 is moved from the position, at which the sleeve 220 engages with the first synchronized cone 250a, onto the other side in the axial direction, the index key 230 is moved onto the other side in the axial direction together with the sleeve 220 by the frictional force generated between the projection 231 and the second horizontal portion 225b.

Figure 16:
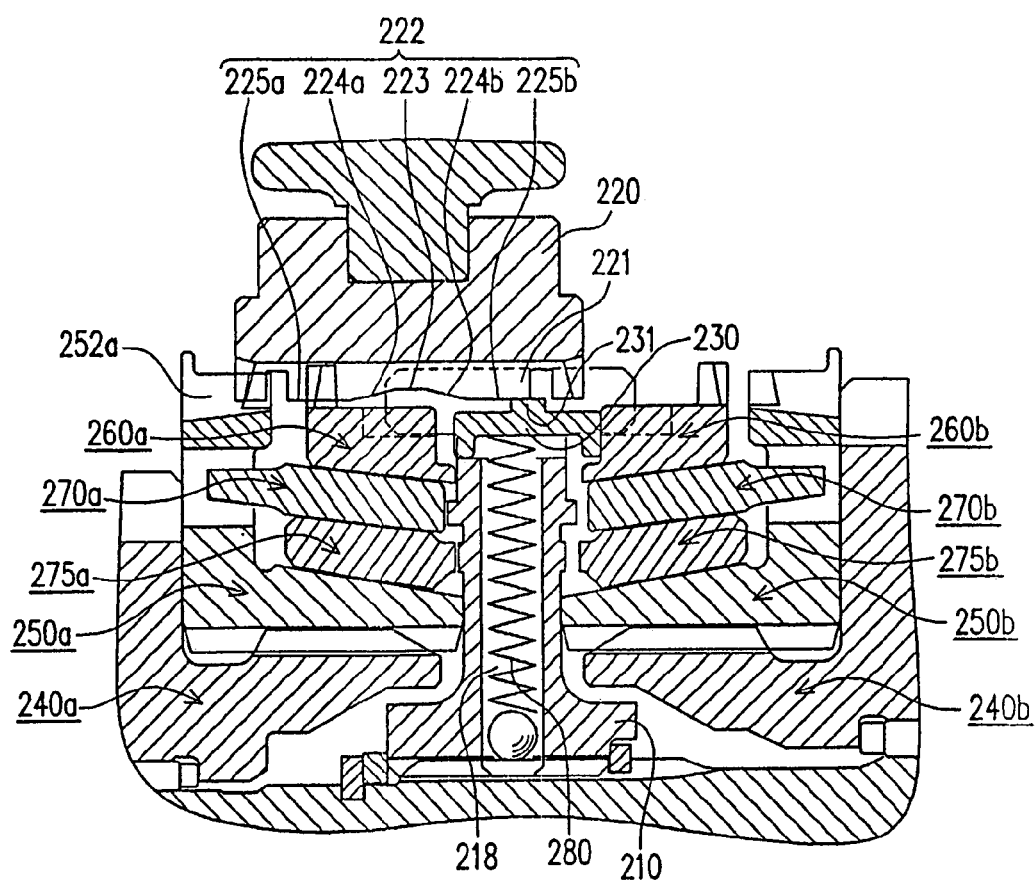
FIG. 16 is a longitudinal cross-sectional side view showing the synchronous gear device shown in FIGS. 9 and 10, in a state in which the index key moves the synchronizer ring on the other side to a position outward in the axial direction by moving the sleeve toward the other side in the axial direction from the meshing position shown in FIG. 15.

At this time, the index key 230 presses the second synchronizer ring 260b located at the axially inward position toward the axially outward position (FIG. 16).

When the sleeve 220 is further moved from the state shown in FIG. 16 onto the other side in the axial direction, only the sleeve 220 is moved onto the other side in the axial direction in the state in which the index key 230 is inhibited from being moved onto the other side in the axial direction by the second synchronizer ring 260b. That is to say, after the second synchronizer ring 260b is located at the axially outward position, reaction force in excess of the frictional force generated between the projection 231 and the second horizontal portion 225b by the urging force of the urging member 280 is applied to the index key 230 from the second synchronizer ring 260b. Therefore, the index key 230 stays at that position while only the sleeve 220 is moved onto the other side in the axial direction, and thus, it is returned to the neutral position (see FIG. 17).

Figure 17:
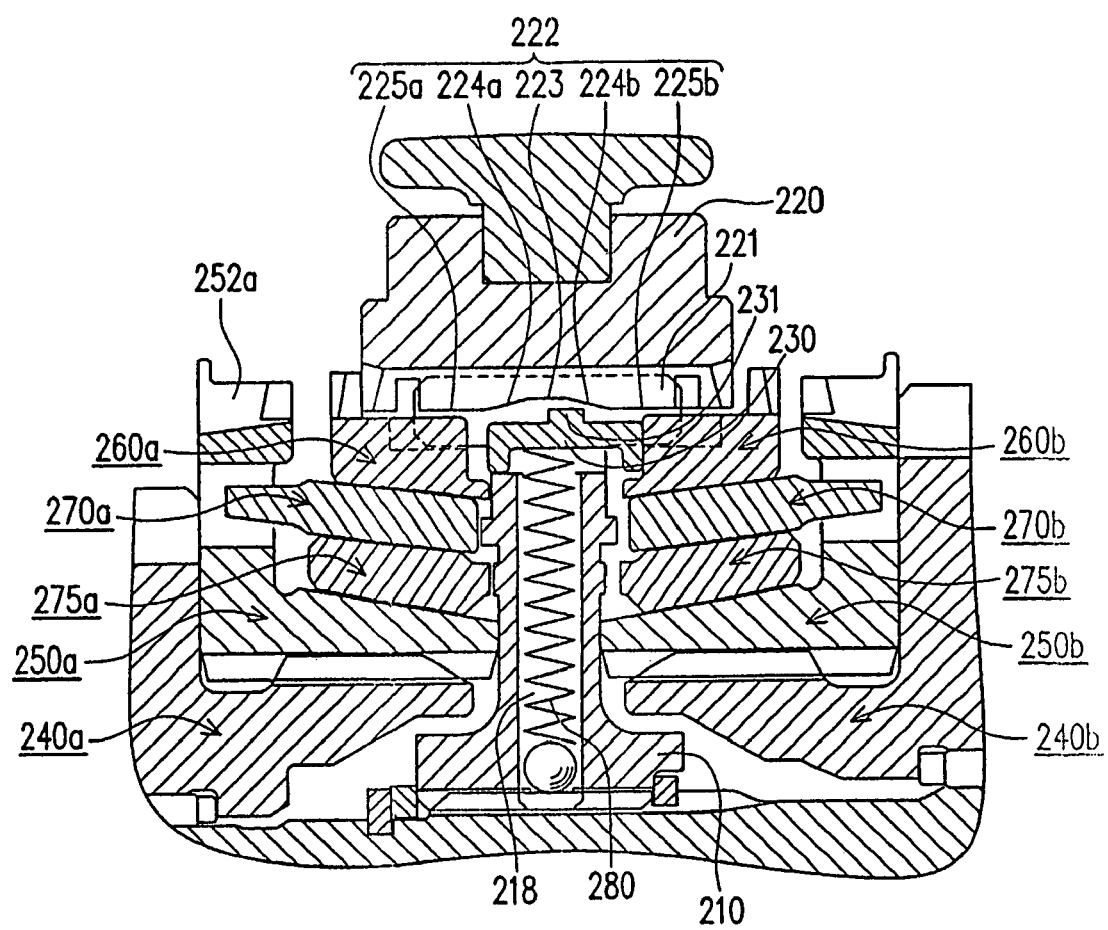
FIG. 17 is a longitudinal cross-sectional side view showing the synchronous gear device shown in FIGS. 9 and 10, in a state in which the sleeve is returned to the neutral position by moving the sleeve toward the other side in the axial direction from the position shown in FIG. 8.
Figure 18A:
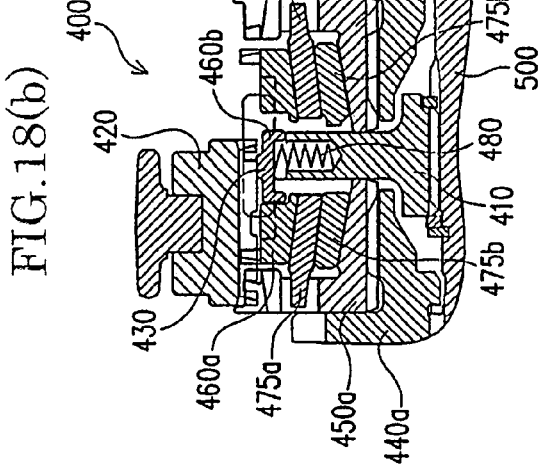
FIGS. 18($a$) to 18($d$) are longitudinal cross-sectional side views showing a conventional synchronous gear device, wherein FIG. 18($a$) illustrates a reference state in which a sleeve and an index key are located at a neutral position.
FIG. 18(b) illustrates a state in which a spline of the sleeve meshes with a chamfer in one synchronized cone by moving the sleeve toward one side in an axial direction.
FIG. 18(c) illustrates a state during which the sleeve is moved toward the other side in the axial direction so as to return the sleeve from the meshed position to the neutral position.
FIG. 18(d) illustrates a state in which the sleeve is returned to the neutral position.
Figure 18B:
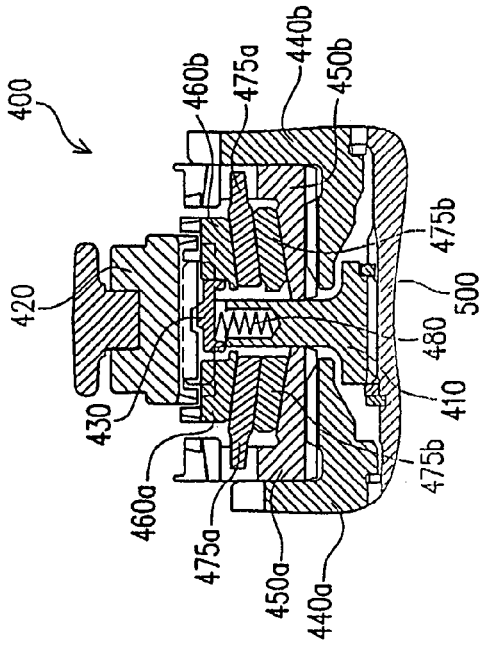
Figure 18C:
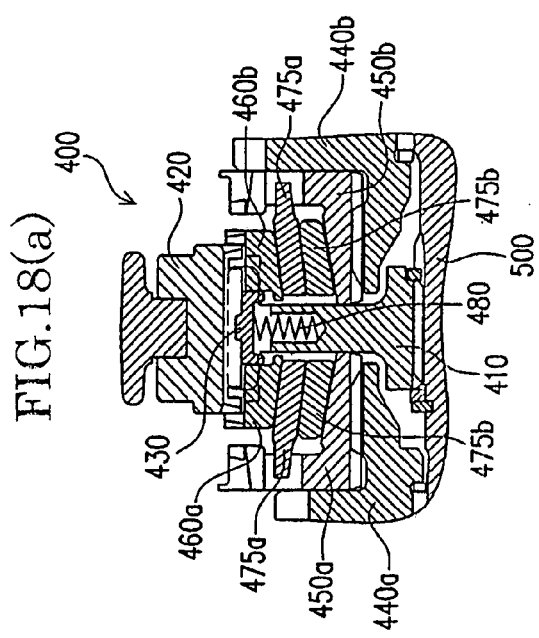
Figure 18D:
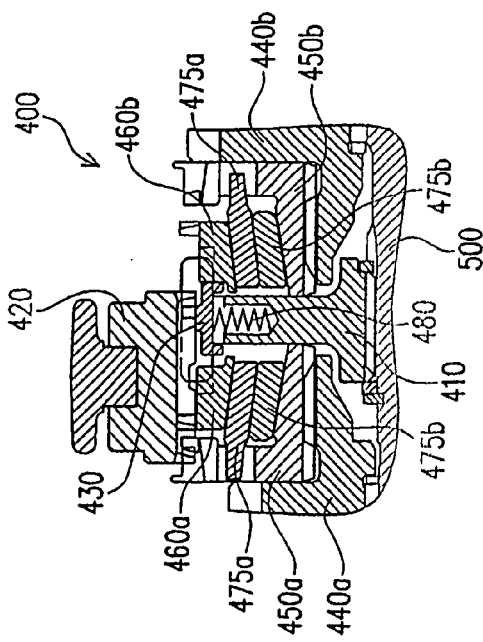

In the synchronous gear device 201 according to the present preferred embodiment having the above-described configuration, when the sleeve 220 is returned to the neutral position, as shown in FIG. 17, the projection 231 of the index key 230 always engages with the second inclining portion 224b of the sleeve 220. Therefore, the index key 230 urged toward the sleeve 220 by the urging member 280 is moved in such a manner that the projection 231 is oriented toward the deepest portion 223 along the second inclining portion 224b, and thus, the index key 230 is automatically returned to the neutral position.

In other words, in the synchronous gear device 201 according to the present preferred embodiment, the axial lengths A of the inclining portions 224a, 224b are set to be greater than the movement distance B in the axial direction, by which the index key 230 moves from the neutral position, so as to move the synchronizer rings 260a, 260b from the axially inward position to the axially outward position. As a consequence, even if the index key 230 is most separated from the neutral position outward in the axial direction, the projection 231 of the index key 230 is fitted to the inclining portions 224a, 224b of the sleeve 220, when the sleeve 220 is returned to the neutral position. Thus, it is possible to effectively prevent any inconvenience that the index key 230 cannot be returned to the neutral position even if the sleeve 220 is returned to the neutral position.

More preferably, in the case of the configuration in which an axial distance C is defined between the axial outer ends of the synchronizer rings 260a, 260b and the opposite portions of the synchronized cones 250a, 250b when the synchronizer rings 260a, 260b are located at the axially outward position (see FIG. 9), the axial length A of the inclining portions 224a, 224b can become greater than a distance obtained by adding the axial distance C to the axial movement distance B of the index key 230.

In particular, in the case of the existence of the clearance of the axial distance C, if the frictional surfaces at the synchronizer rings 260a, 260b and/or the synchronized cones 250a, 250b are abraded, the axially outward position of the synchronizer rings 260a, 260b is shifted outward in the axial direction more than the initial position.

In other words, in the case where the frictional surfaces at the synchronizer rings 260a, 260b and/or the synchronized cones 250a, 250b are abraded, the axially outward position of the synchronizer rings 260a, 260b may be shifted to a position at which the synchronizer rings 260a, 260b are in abutment with the opposite portions of the synchronized cones 250a, 250b.

In this case, the index key 230 is moved by (B+C) in the axial direction from the neutral position.

As a consequence, the sleeve 220 is returned to the neutral position so that the index key 230 can be automatically returned to the neutral position by satisfying the inequality: (axial length A)>(axial length B+axial length C) even if the frictional surfaces of the synchronizer rings 260a, 260b and/or the synchronized cones 250a, 250b are abraded.

The present preferred embodiment has been described by way of the case in which the sleeve 220 is moved onto one side in the axial direction, to be thus coupled to the first gear 240a, and then, the sleeve 220 is moved onto the other side in the axial direction, to be thus returned to the neutral position. However, the sleeve 220 may be moved onto the other side in the axial direction, to be thus coupled to the second gear 240b, and then, the sleeve 220 may be moved onto one side in the axial direction, to be thus returned to the neutral position.

Furthermore, although the present preferred embodiment has been described by way of the configuration in which the circumferential surface 222 of the sleeve 220 has the horizontal portions 225a, 225b, the present invention is not limited to this configuration.

That is to say, the circumferential surface 222 of the sleeve 220 may be configured to have only the deepest portion 223 and the inclining portions 224a, 224b located on both sides of the deepest portion 223 in the axial direction.

In such other configuration, in the case where it is difficult to form the stopper grooves 227a, 227b in the sleeve 220, a link mechanism or the like for operating the sleeve 220 may be provided with a stopper mechanism.

Embodiment 3

Figure 19:
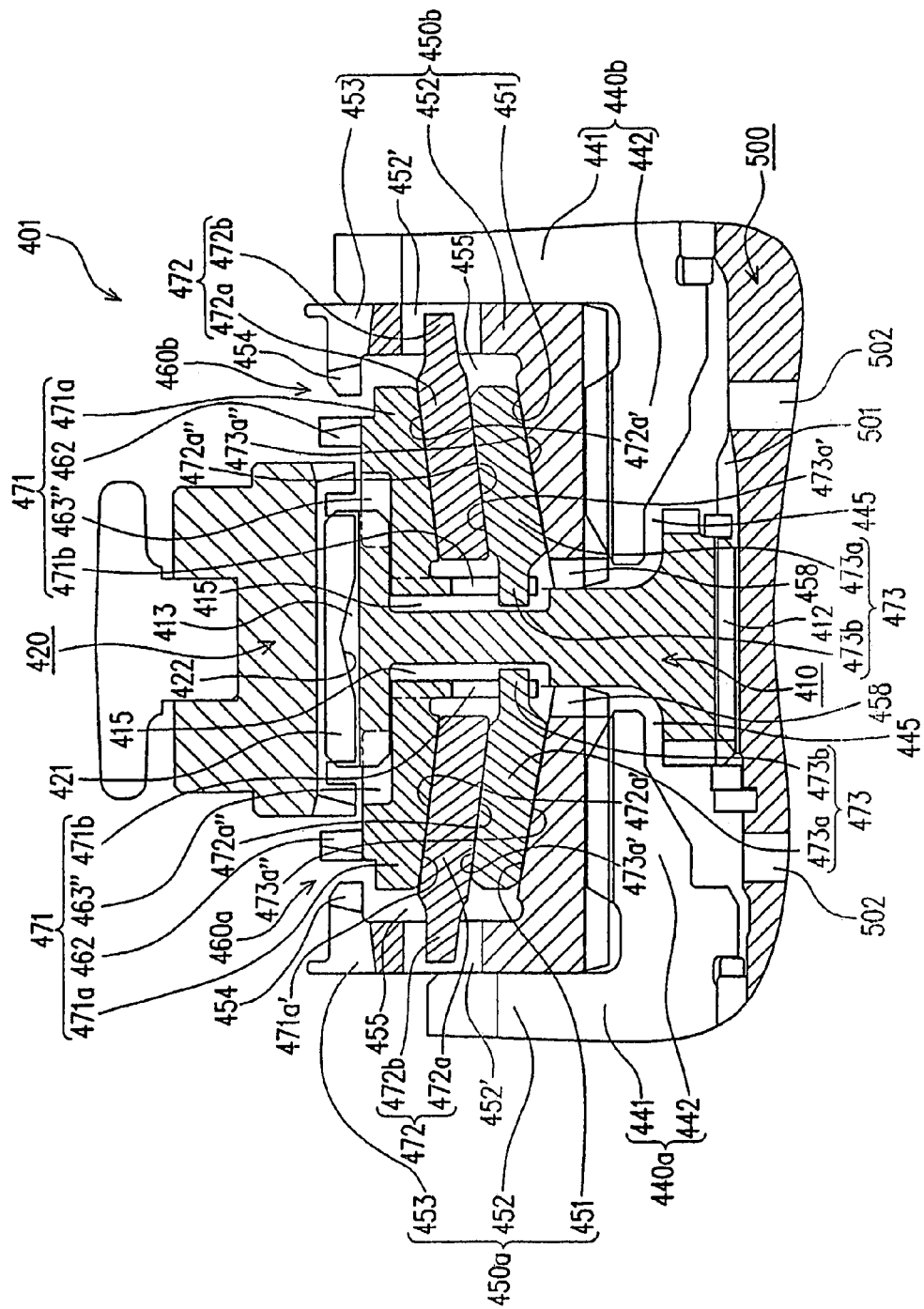
FIG. 19 is a longitudinal cross-sectional side view showing a synchronous gear device according to a third preferred embodiment of the present invention, in a cross section passing a cavity formed at a clutch hub.
Figure 20:
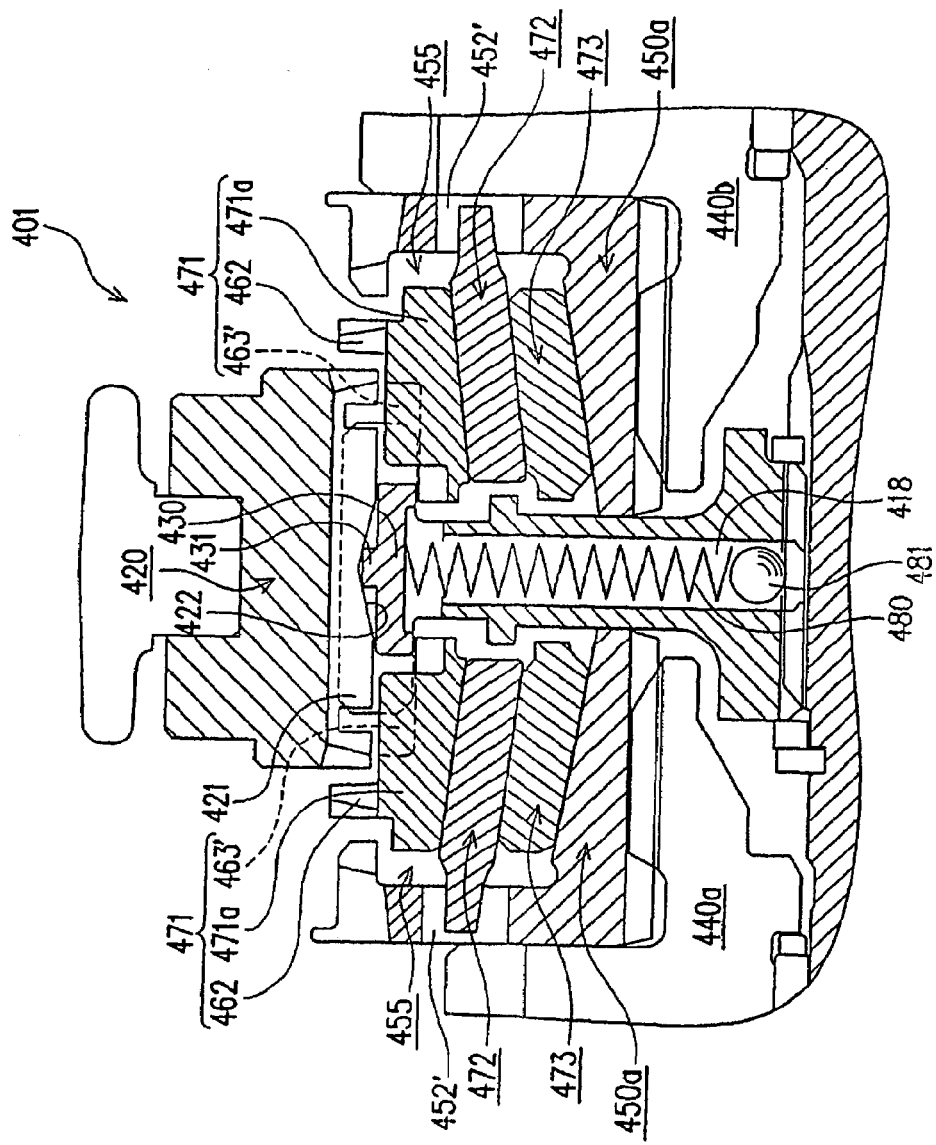
FIG. 20 is a longitudinal cross-sectional side view showing the synchronous gear device with reference to a position different in a circumferential direction from that in FIG. 19, in a cross section passing a radial hole for accommodating therein a spring formed at the clutch hub.

Hereinafter, description will be given of a synchronous gear device according to a third preferred embodiment of the present invention with reference to the attached drawings. FIG. 19 is a longitudinal cross-sectional side view showing a synchronous gear device 401 according to the present preferred embodiment. Furthermore, FIG. 20 is a longitudinal cross-sectional side view showing the synchronous gear device 401 located at a position different in a circumferential direction from that in FIG. 19.

As shown in FIG. 19, the synchronous gear device 401 according to the present preferred embodiment comprises a clutch hub 410, a sleeve 420, an index key 430, first and second gears 440a, 440b disposed on one side and the other side in the axial direction of the clutch hub 410, first and second synchronized cones 450a, 450b interposed between the clutch hub 410 and the first and second gears 440a, 440b, respectively, first and second synchronizer rings 460a, 460b interposed between the clutch hub 410 and the first and second synchronized cones 450a, 450b, respectively, and a spring 480.

Although in the present preferred embodiment, there are provided the gears 440 (440a, 440b), the synchronized cones 450 (450a, 450b) and the synchronizer rings 460 (460a, 460b) on both sides in the axial direction of the clutch hub 410, it is to be understood that there may be provided the gears 440, the synchronized cones 450 and the synchronizer rings 460 only on one side in the axial direction of the clutch hub 410.

The clutch hub 410 and the first and second gears 440a, 440b can be rotated relatively to each other on one shaft 500 (hereinafter, referred to as a transmission shaft or a rotary shaft) out of a driving shaft and a driven shaft.

In the present preferred embodiment, the clutch hub 410 is supported in a non-rotatable manner relatively to the rotary shaft 500 and in a non-slidable manner in an axial direction. In contrast, the first and second gears 440a, 440b are supported in a rotatable manner relatively to the rotary shaft 500.

The clutch hub 410 is constituted of a ring-like member having a center hole 411, into which the rotary shaft 500 is inserted. The clutch hub 410 is provided at the circumferential surface of the center hole with an inner spline 412 to be fitted to a spline 501 disposed at the peripheral surface of the rotary shaft 500, and further, at the peripheral surface of the center hole with an outer spline 413 to be fitted to the sleeve 420.

The sleeve 420 is constituted of a ring-like member having an inner spline 421 to be fitted to the outer spline 413 of the clutch hub 410. The sleeve 420 is fitted in a non-rotatable manner relatively to the clutch hub 410 and in a slidable manner in the axial direction.

At the inner spline 421 of the sleeve 420 is formed a recess 422 to be fitted around a projection, described later, of the index key 430.

The index key 430 is interposed between the clutch hub 410 and the sleeve 420 in a non-rotatable manner relatively to the clutch hub 410 and in a movable manner in the axial direction.

Specifically, the index key 430 is contained inside of a cutout 414 formed at the periphery of the clutch hub 410 along the axial direction.

Figure 21:
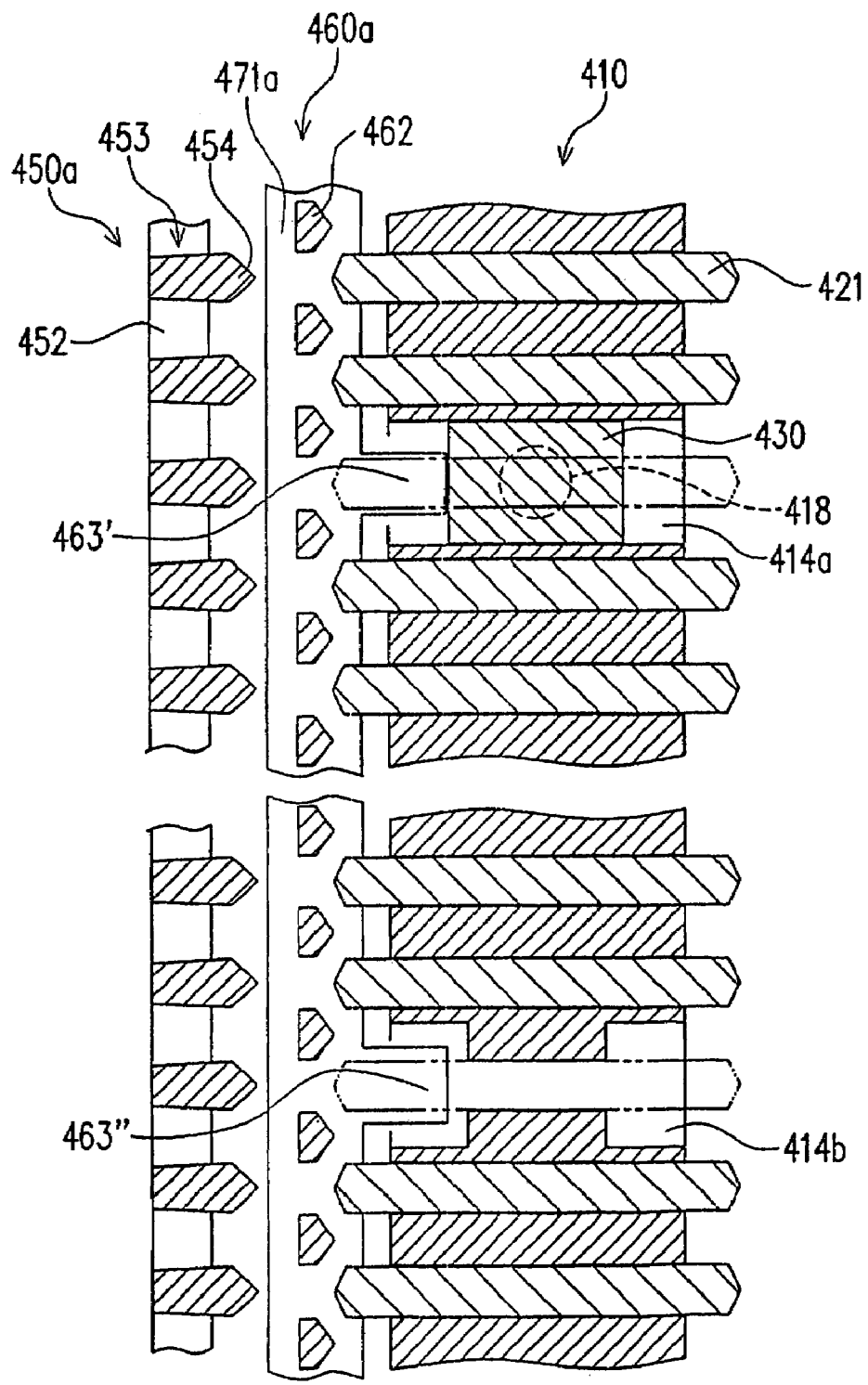
FIG. 21 is a cross-sectional view, in development in the circumferential direction, showing the synchronous gear device shown in FIGS. 19 and 20.

FIG. 21 is a cross-sectional view, in development in the circumferential direction, showing the synchronous gear device according to the present preferred embodiment.

Figure 22:
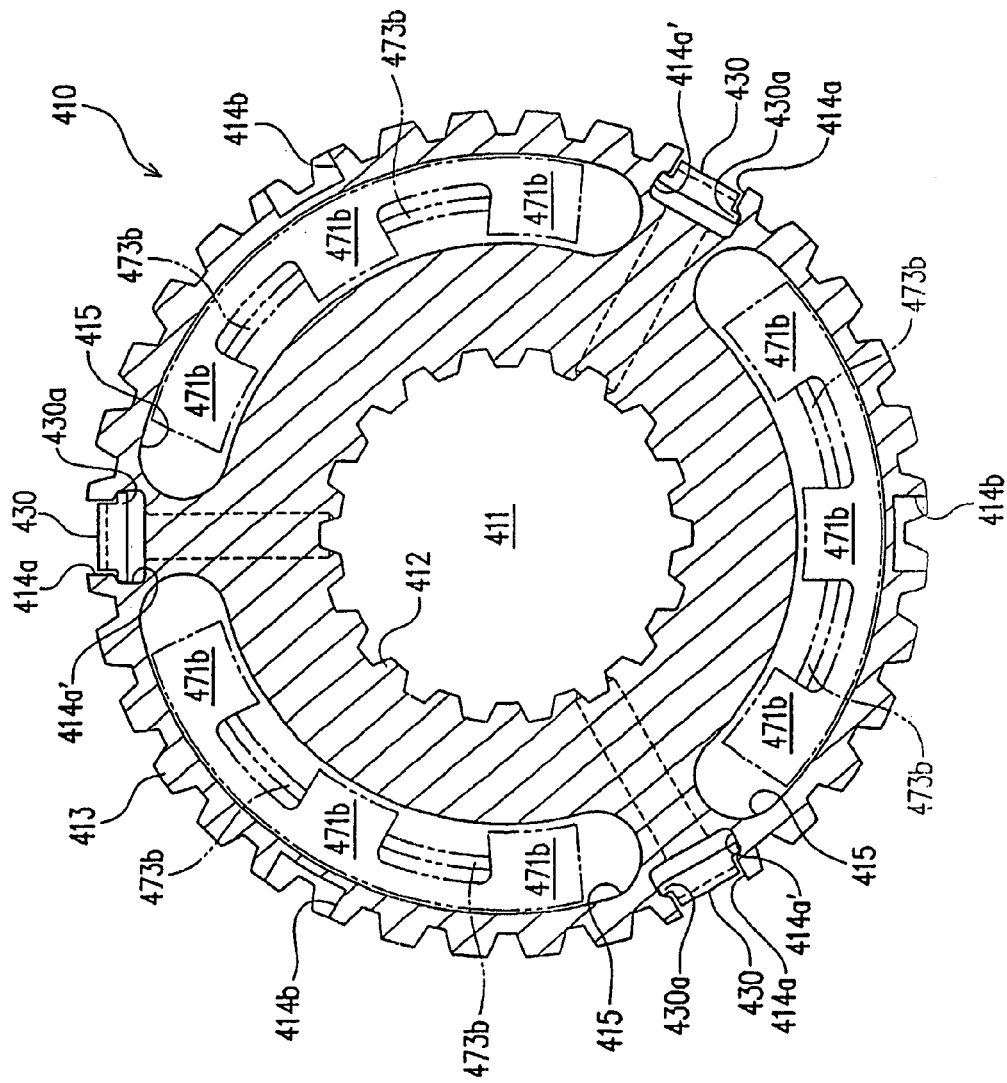
FIG. 22 is a longitudinal cross-sectional front view showing the synchronous gear device shown in FIGS. 19 to 21.
Figure 23:
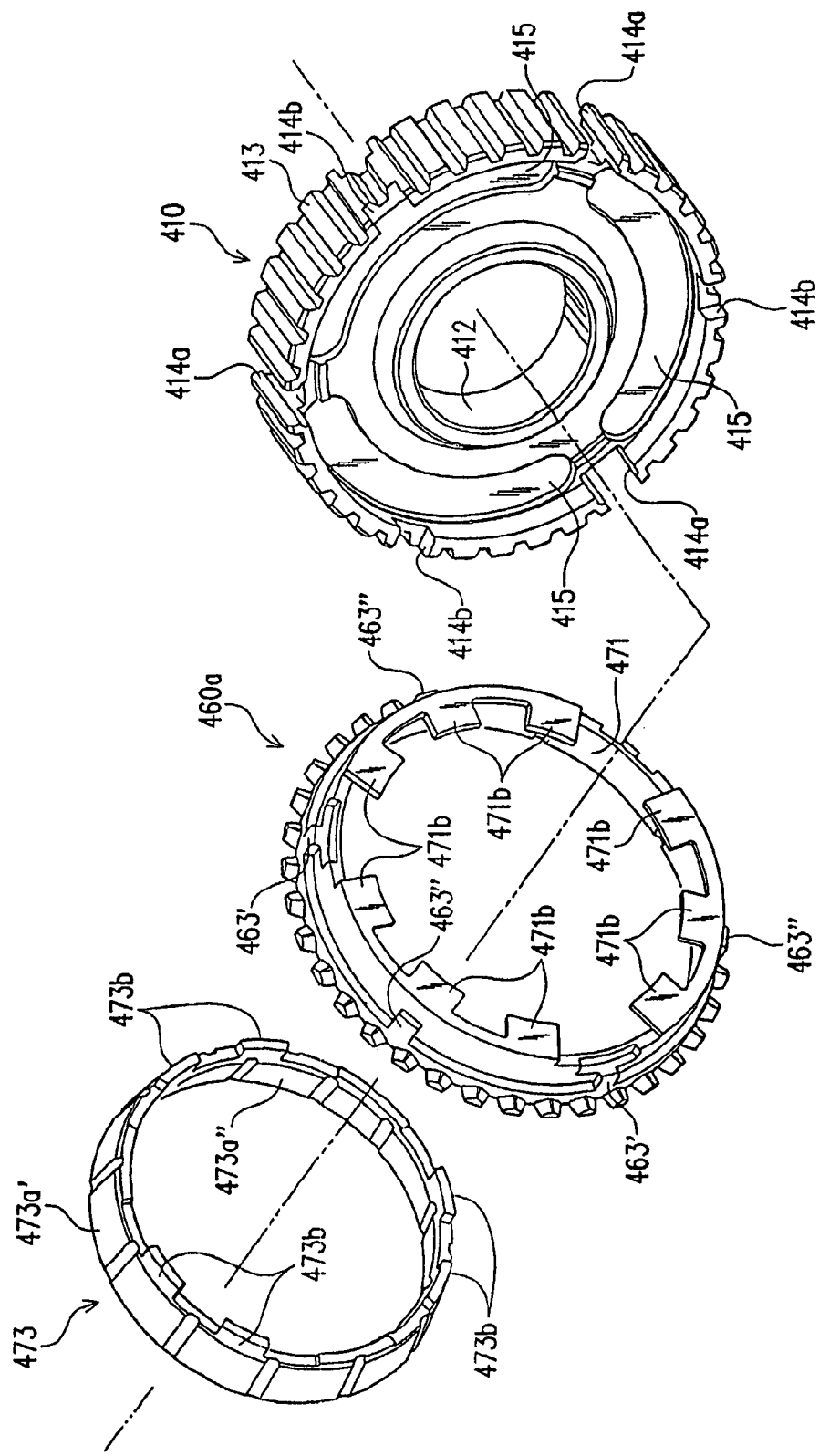
FIG. 23 is an exploded perspective view showing the synchronous gear device shown in FIGS. 19 to 22.

Moreover, FIGS. 22 and 23 are a longitudinal cross-sectional front view and an exploded perspective view of the synchronous gear device, respectively.

In particular, as shown in FIGS. 21 to 23, the plurality of cutouts 414 are formed at the clutch hub 410.

Fitting projections 463', 463" formed at the synchronizer rings 460, described later, are adapted to be fitted into the plurality of cutouts 414. And thus, the index key 430 is configured to be disposed in a predetermined cutout 414a out of the plurality of cutouts 414.

The index key 430 has a projection 431 projecting outward in a radial direction. The projection 431 is fitted into the recess 422 formed at the inner spline 421 of the sleeve 420 by the urging force of the spring.

As shown in FIGS. 22 and 23, in the present preferred embodiment, the index key 430 has a projection 430a projecting toward both sides in a rotating direction at a position inward in a radial direction, and is constituted of a convex-shape member as viewed from the front.

At the cutout 414a, into which the index key is fitted, is formed a groove 414a' in conformity of the convex-shape of the index key.

With this configuration, when the index key 430 is incorporated in the cutout 414a of the clutch hub 410 along the direction of the rotary axis, the index key 430 cannot be slipped off outward in the radial direction.

Each of the first and second gears 440a, 440b is operatively connected to the other shaft of the driving shaft and the driven shaft. In other words, the synchronous gear device 401 according to the present preferred embodiment is configured such that the clutch hub 410 is selectively connected to the first or second gear 440a or 440b by moving the sleeve 420 onto one side or the other side in the axial direction.

Incidentally, although description will be given below of only the first gear 440a, the first synchronized cone 450a and the first synchronizer ring 460a positioned on one side in the axial direction of the clutch hub 410, the description is applied also to the second gear 440b, the second synchronized cone 450b and the second synchronizer ring 460b positioned on the other side in the axial direction of the clutch hub.

The first gear 440a has a main body 441 having a chamfer at the peripheral surface thereof and a spline portion 442 extending in a direction approximate to the clutch hub 410 from the main body 441.

The first synchronized cone 450a is connected in a non-rotatable manner relatively to the first gear 440a via the spline 442 of the first gear 440a, and is fixed in a non-slidable manner in the axial direction by the first gear 440a and the clutch hub 410. Naturally, the first synchronized cone 450a may be formed integrally with the first gear 440a.

The first synchronized cone 450a has a tapered peripheral frictional surface 451, a wall 452 extending from the outer end in the axial direction of the tapered peripheral frictional surface 451 outward in the radial direction, and a spline 453 disposed at a peripheral edge in the radial direction on the wall 452.

The spline 453 of the first synchronized cone 450a is configured in such a manner as to be fitted to the inner spline 421 of the sleeve 420, and further, at least a chamfer 454 projects from the wall 452 inward in the axial direction (i.e., in a direction approximate to the clutch hub).

Namely, the first synchronized cone 450a is configured in such a manner that a cavity 455 is formed inward in the radial direction of the chamfer 454 of the spline 453.

Although the details will be described later, when the first synchronizer ring 460a is located at an axially outward position, at which the first synchronizer ring 460a frictionally operatively engages with the first synchronized cone 450a, at least a part of the first synchronizer ring 460a is exposed to the cavity 455.

The first synchronizer ring 460a can be relatively rotated by a predetermined pitch in the circumferential direction with respect to the clutch hub 410, and further, can be relatively moved in the axial direction with respect to the clutch hub 410.

In particular, the first synchronizer ring 460a has an fitting projection 463 to be fitted into the cutout 14 of the clutch hub 410, and is configured to be relatively rotated by a predetermined pitch with respect to the clutch hub 410 by the fitting projection 463.

Preferably, the fitting projection 463 has the narrow first fitting projection 463' to be fitted into the cutout 414a having the index key 430 disposed therein out of the plurality of cutouts 414, and the wide second fitting projection 463" to be fitted into the cutout 414b having no index key 430 disposed therein out of the plurality of cutouts 414, as shown in FIG. 21.

More preferably, the second fitting projection 463" is formed in such a size that the synchronizer ring 460a can be relatively moved by a ½ pitch of the outer spline 413 of the clutch hub 410 in the circumferential bi-direction with respect to the clutch hub 410.

With this configuration, when the second fitting projection 463" abuts against the circumferential wall of the cutout 414b, the chamfer 462 of the synchronizer ring 460a, described later, and the spline 421 of the sleeve 420 are turned into an opposite index key state; in contrast, when the second fitting projection 463" is located substantially at the center in the circumferential direction of the cutout 414b, the chamfer 462 and the spline 421 of the sleeve 420 are turned into an engageable state.

Furthermore, the first synchronizer ring 460a can be moved between the axially outward position and the axially inward position by the index key 430 interlockingly with the movement of the sleeve 420 outward in the axial direction according to an external operation. When the first synchronizer ring 460a is pressed to the axially outward position, it operatively frictionally engages with the first synchronized cone 450a, thereby synchronously rotating the clutch hub 410 and the first synchronized cone 450a.

As described above, the present preferred embodiment is configured such that at least a part of the first synchronizer ring 460a is exposed to the cavity 455 formed at the first synchronized cone 450a when the first synchronizer ring 460a is located at the axially outward position, at which it frictionally engages with the first synchronized cone 450a, thereby presenting the following effects.

Namely, with this configuration, the axial movement range of the synchronizer ring moving between the axially inward position and the axially outward position can be enlarged without increasing the distance in the axial direction between the first synchronized cone 450a and the clutch hub 410. Consequently, a synchronous clutch capacity can be increased without increasing the axial and radial dimensions of the synchronous gear device 401.

In the present preferred embodiment, in order to increase the substantially frictional area between the first synchronizer ring 460a and the first synchronized cone 450a, the first synchronizer ring 460a is provided with a plurality of cone rings 471a to 473a.

More particularly, the first synchronizer ring 460a is provided with an outer cone ring 471, a middle cone ring 472 and an inner cone ring 473, which are superimposed in the radial direction.

The outer cone ring 471 includes the ring-like main body 471a having a tapered circumferential frictional surface 471a' facing to the tapered peripheral frictional surface 451 of the first synchronized cone 450a, a connecting piece 471b extending inward in the radial direction from an axial inner end of the main body 471a, the chamfer 462 disposed at the peripheral edge in the radial direction of the main body 471a, and the first and second fitting projections 463', 463" disposed inward in the axial direction beyond the chamfer 462 out of the peripheral edge of the main body 471a.

The middle cone ring 472 includes a tapered peripheral frictional surface 472a' in frictional contact with the tapered circumferential frictional surface 471a' of the outer cone ring 471, and a tapered circumferential frictional surface 472a" facing to the tapered peripheral frictional surface 451 of the first synchronized cone 450a. The middle cone ring 472 cannot be rotated relatively to the first synchronized cone 450a.

Specifically, the middle cone ring 472 is provided with a main body 472a having the tapered peripheral frictional surface 472a' and the tapered circumferential frictional surface 472a", and a projection 472b extending outward in the axial direction from the main body 472a. The projection 472b is fitted into an engaging hole 452' formed on the wall 452 of the first synchronized cone 450a.

The inner cone ring 473 includes a tapered peripheral frictional surface 473a' in frictional contact with the tapered circumferential frictional surface 472a" of the middle cone ring 472, and a tapered circumferential frictional surface 473a" in frictional contact with the tapered peripheral frictional surface 451 of the first synchronized cone 450a. The inner cone ring 473 is connected in a non-rotatable manner relatively to the outer cone ring 471.

Specifically, the inner cone ring 473 is provided with a main body 473a having the tapered peripheral frictional surface 473a' and the tapered circumferential frictional surface 473a", and an extension 473b extending inward in the axial direction from the main body 473a.

The extension 473b has a fitting hole (not shown) into which the connecting piece 471b of the outer cone ring 471 is fitted.

In other words, the connecting piece 471b of the outer cone ring 471 and the extension 473b of the inner cone ring 473 constitute a connecting portion for integrally connecting the outer cone ring 471 and the inner cone ring 473.

In this manner, the outer cone ring 471 and the inner cone ring 473 cannot be relatively moved in the axial direction by the effect of the connecting portion, so that the plurality of frictional surfaces between the first synchronizer ring 460a and the first synchronized cone 450a can be effectively used, thereby increasing the synchronous clutch capacity.

A large size of the synchronous gear device 401 caused by the connecting portion can be prevented in the present preferred embodiment by the following configuration.

That is to say, in the synchronous gear device 401 according to the present preferred embodiment, cavities 415 opened outward in the axial direction are formed at the axial end of the clutch hub 410, wherein the connecting portions 471b, 473b are located within the cavities 415 in the axial direction, as shown in FIGS. 19, 22 and 23.

Particularly, when the first synchronizer ring 460a frictionally disengages from the first synchronized cone 450a (that is, when the first synchronizer ring 460a is positioned at the axially inward position), at least some or all of the connecting portions 471b, 473b are located within the cavities 415.

As is well shown in FIG. 22, the cavity 415 is formed at a position in the circumferential direction different from a position at which the spring 480 is accommodated.

In other words, the spring 480 is accommodated in the clutch hub 410 in such a manner as to press the index key 430 against the inner spline 421 of the sleeve 420.

Specifically, a radial hole 418 opened at a peripheral edge in the radial direction is formed at the clutch hub 410, to thus contain the spring 480 therein.

The cavity 415 is formed at the position in the circumferential direction different from the radial hole 418, thereby increasing the synchronous clutch capacity while achieving a small size of the device per se as possible.

In the present preferred embodiment, the three radial holes 418 are spaced at equal intervals, i.e., at every 120° in the circumferential direction. The cavity 415 is formed into an elliptic shape, as viewed from the front, extending between one radial hole 418 and the other radial hole 418 adjacent to the former radial hole 418 (see FIG. 22).

As described above, in the synchronous gear device 401 according to the present preferred embodiment, the outer cone ring 471 and the inner cone ring 473 are connected to each other via the connecting portions 471b and 473b in a relatively immovable manner, thereby increasing the synchronous clutch capacity.

Since the connecting portions 471b, 473b are located between the clutch hub 410 and the first synchronized cone 450a, in a case where the connecting portions 471b, 473b are simply provided without a specific configuration, it is necessary to enlarge a containing space for the first synchronizer ring 460a, defined by the axial end of the clutch hub 410 and the axial end of the wall 452 of the first synchronized cone 450a.

In regard to this, the synchronous gear device 401 according to the present preferred embodiment is configured such that the cavity 415 is formed at the axial end of the clutch hub 410, and that at least a part of the connecting portions 471b, 473b is located inside of the cavity 415, as described above.

Consequently, the enlargement of the containing space caused by providing the connecting portions 47b, 473b can be suppressed as possible.

Incidentally, in the present preferred embodiment, a group consisting of the three connecting portions 471b arranged in the circumferential direction is located inside of the cavity 415, as shown in FIG. 22.

Moreover, a group consisting of the two connecting portion 473b interposed between the three connecting portions 471b, respectively, is located inside of the cavity 415.

Additionally, in the synchronous gear device 401 according to the present preferred embodiment, the cavity 415 and the radial hole 418 are formed at different positions along the circumferential direction. As a consequence, the axial thickness of the clutch hub 410 is reduced as possible.

Namely, in the case where the cavity 415 and the radial hole 418 are formed at the same position in the circumferential direction of the clutch hub 410, the axial thickness of the clutch hub 410 need be made to be great, thereby inducing a large size of the device per se in addition to an increase in material cost.

To the contrary, in the present preferred embodiment, the cavity 415 and the radial hole 418 are different from each other in circumferential position, as described above.

Consequently, it is unnecessary to set the axial thickness of the clutch hub 410 in consideration of the total thickness adding that of the cavity 415 to that of the radial hole 418, thus reducing the axial thickness of the clutch hub 410 as possible.

Preferably, a lubricant supplying passage 502 opened to the peripheral surface is formed at the rotary shaft 500, so that the lubricant supplying passage 502 can communicate with the cavity 415.

With this configuration, the cavity 415 can serve as "an oil sump", and therefore, a lubricant can be effectively supplied to the frictional surface between the first synchronizer ring 460a and the first synchronized cone 450a.

The lubricant supplying passage 502 can communicate with the cavity 415 with various structures. For example, a clearance 445 communicating with the lubricant supplying passage 502 is formed between the spline 442 of the first gear and the axial end of the clutch hub 410, and further, a cutout 458 for achieving the communication between the clearance 445 and the cavity 415 is formed at the axial inner end of the first synchronized cone 450a, thereby allowing the passage 502 and the cavity 415 to communicate with each other.

Preferably, the radial hole 418 is opened at the inner end thereof to the center hole of the clutch hub 410 while at the outer end thereof to the cutout 414a of the clutch hub 410, and further, it has a first diameter at the center and outer end and a second diameter smaller than the first diameter at the inner end.

A ball 81 having a diameter smaller than the first diameter and greater than the second diameter is disposed at the inner end of the radial hole 418, and then, the spring 80 is contained in the radial hole 418 in such a manner that the base end engages with the ball 481.

When the clutch hub 410 is spline-coupled to the rotary shaft 500, the radial hole 418 is opened at the inner end thereof to the center hole of the clutch hub 410 at a position facing to the projection of the spline 501 in the rotary shaft 500.

With this configuration, the index key 430 and the sleeve 420 can be efficiently incorporated to the clutch hub 410.

In other words, the spring 480 presses the index key 430 against the inner spline 421 of the sleeve 420 at all times. As a consequence, the index key 430 and the sleeve 420 need be fitted around the clutch hub 410 in the state in which the spring 480 is compressed at a compression quantity with the retention resiliency of the spring 480 exceeding a predetermined value.

To the contrary, in the present preferred embodiment, first, an assembly is formed by fitting the index key 430 and the sleeve 420 around the clutch hub 410 containing the ball 481 and the spring 480 therein, and then, the assembly is supported by the rotary shaft 500, thereby achieving a predetermined compression state of the spring 480. Thus, it is possible to easily incorporate the index key 430 and the sleeve 420 in the clutch hub 410.

The invention claimed is:

1. A traveling transmission for a working vehicle, comprising an auxiliary transmission having at least two speed stages, which is interposed between a main clutch and a multi-speed-stage mechanical transmission,
    wherein said auxiliary transmission is configured such that its power transmission is cut out during a disengagement operation of said main clutch after said main clutch is completely disengaged, and its power transmission is restored during the engagement operation of said main clutch before said main clutch starts a power transmission.

2. A traveling transmission according to claim 1,
    wherein the power transmission of the said auxiliary transmission is performed or is cut out based on an operating quantity of an operating member for engaging or disengaging said main clutch.

3. A traveling transmission according to claim 1,
    wherein said auxiliary transmission is configured as a high-low speed selector device for obtaining the two speed stages, including a hydraulic-operated first hydraulic clutch and a spring-operated second hydraulic clutch,
    wherein said auxiliary transmission is such configured as to have operating oil drained from said first hydraulic clutch and to have the operating oil supplied to said second hydraulic clutch, thereby cutting out the power transmission of said auxiliary transmission,
    wherein said second hydraulic clutch includes:
        a plurality of frictional elements;

a clutch cylinder having a pressure receiving surface at its internal end surface and having a plurality of cutout holes cut out on its free end side, the pressure receiving surface contacting with a frictional element at a foremost end of the plurality of frictional elements when in a clutch engagement state;

a piston accommodated inside of the clutch cylinder so as to release an engagement between the frictional elements by a hydraulic effect;

an operating plate engaging with the piston in a slidable manner in the clutch axial direction and in a non-rotatable manner relative to the clutch cylinder;

a pressing plate spaced apart from the operating plate so as to hold the plurality of frictional elements between the operating plate and the pressing plate, the pressing plate being connected to the operating plate so as to be moved integrally with the operating plate;

a spring receiving ring connected to the free end of the clutch cylinder; and a disk spring disposed between the pressing plate and the spring receiving ring, wherein said operating plate includes a ring-like body engaging with the piston, and a fitting projection extending outward in the radial direction from the body, the fitting projection being fitted into a cutout hole of the plurality of cutout holes formed at the clutch cylinder, wherein said pressing plate includes a ring-like body engaging with the disk spring, and a fitting projection extending outward in the radial direction from the body, the fitting projection corresponding to the fitting projection formed at the operating plate, and wherein said operating plate and said pressing plate are connected interlockingly with each other via an interlocking rod disposed at the fitting projection of the operating plate and the fitting projection of the pressing plate.

4. A traveling transmission according to claim 3, wherein a frictional element of the plurality of frictional elements is supported by the clutch cylinder, wherein said frictional element includes a ring-like body frictionally engaging with an adjacent frictional element of the plurality of frictional elements, and a fitting projection extending outward in the radial direction from the body, the fitting projection being fitted into the cutout hole formed at the clutch cylinder.

5. A traveling transmission according to claim 4, wherein said interlocking rod has small-diameter portions formed at both ends and fitted into fitting holes formed at the fitting projections of the operating plate and the pressing plate, and a large-diameter portion extending between the small-diameter portions, and wherein said fitting projection of said frictional element has a groove opened outward in the radial direction, said groove being fitted around the large-diameter portion of said interlocking rod.

6. A traveling transmission according to claim 3, wherein said first hydraulic clutch includes:
a piston disposed on a side opposite to the piston of the second hydraulic clutch with reference to a central partition wall of the clutch cylinder;
a plurality of frictional elements frictionally engaged by the piston;
a pressure receiving plate disposed on a side opposite to the piston while holding the frictional elements therebetween;
a return spring for urging the piston in a direction remote from the frictional elements; and
a check valve for preventing simultaneous engagement of the first and second hydraulic clutches, wherein said check valve includes an axial hole having a base end opened to a clutch axial end of the cutout hole formed in the clutch cylinder and a tip end ended inside of the clutch cylinder, a hollow sleeve fitted into the axial hole, a spring interposed between the tip end of the axial hole and an inner end of the sleeve, and a ball seated at a valve seat formed at the inner end of the sleeve by the spring, wherein said axial hole is designed to communicate with a disposing space for the piston of the first hydraulic clutch via a groove formed at the clutch cylinder, and wherein said groove allows the inside of the axial hole and the disposing space to communicate with each other when the piston of the first hydraulic clutch slides toward the frictional elements by a hydraulic effect, and is closed by the piston of the first hydraulic clutch when the piston of the first hydraulic clutch is most separated from the frictional elements by the urging force of the return spring after the hydraulic effect exerted on the piston is stopped.

7. A traveling transmission according to claim 6, wherein an oil relief groove is formed at the sleeve for allowing a hollow portion and a peripheral surface of the sleeve to communicate with each other, and wherein a second oil relief groove is formed at the clutch cylinder, the second oil relief groove communicating with the oil relief groove formed at the sleeve.

* * * * *